United States Patent
Takahashi

[19]

[11] Patent Number: 5,937,093
[45] Date of Patent: Aug. 10, 1999

[54] PATTERN RECOGNITION METHODS AND APPARATUS TO REDUCE PROCESSING TIME BY GROUPNISE COMPARISON OF FEATURES AND COORDINATED DYNAMIC ELIMINATION OF CANDIDATES

[75] Inventor: Hiroyasu Takahashi, Yokohama, Japan

[73] Assignee: International Business Machines Corp., Armonk, N.Y.

[21] Appl. No.: 08/682,347

[22] Filed: Jul. 17, 1996

[30] Foreign Application Priority Data

Jul. 26, 1995 [JP] Japan .................................. 7-190414

[51] Int. Cl.[6] .................................................. G06K 9/64
[52] U.S. Cl. ......................... 382/226; 382/195; 382/218; 382/225
[58] Field of Search .................................. 382/226, 253, 382/190, 192, 225, 217, 218, 195, 224, 228, 229, 227

[56] References Cited

U.S. PATENT DOCUMENTS

| | | | |
|---|---|---|---|
| 5,034,991 | 7/1991 | Hagimae et al. | 382/209 |
| 5,060,277 | 10/1991 | Bokser | 382/160 |
| 5,479,523 | 12/1995 | Gaborski et al. | 382/159 |
| 5,602,938 | 2/1997 | Akiyama et al. | 382/155 |
| 5,748,843 | 5/1998 | Peck et al. | 112/277 |

FOREIGN PATENT DOCUMENTS 6119495  4/1994  Japan .

OTHER PUBLICATIONS

Sone, Hironao et al., "Easy High–Speed Discrimination Method Using Hierarchical Pattern Matching", 1986, pp. 1–9.

*Primary Examiner*—Kim Yen Vu
*Assistant Examiner*—David Rosenblum
*Attorney, Agent, or Firm*—A. Bruce Clay

[57] ABSTRACT

The detection of a nearest neighbor is calculated at high speed and with high accuracy. Feature space grouping is performed, with one, or two or more features being assigned to each group. A check is performed to determine whether or not a calculated distance value that is acquired before the limits for a group is reached has exceeded the threshold value THR_MIX for each group. The threshold value that is set for THR_MIX is the average of the threshold value that is determined based on the cumulative quantity of the features that is acquired and the threshold value that is based on the number of dimensions. When the distance value for each group is greater than the threshold value THR_MIX, first phase screening is performed to exclude, from the succeeding distance calculations, the prototype that provides that distance value. Then, for a group for which the first phase screening is performed, the threshold value THR_RATE is calculated by using the minimum distance value to that group, and the second phase screening is performed.

17 Claims, 15 Drawing Sheets

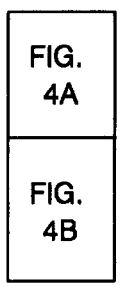
FIG. 4
FIG. 4A
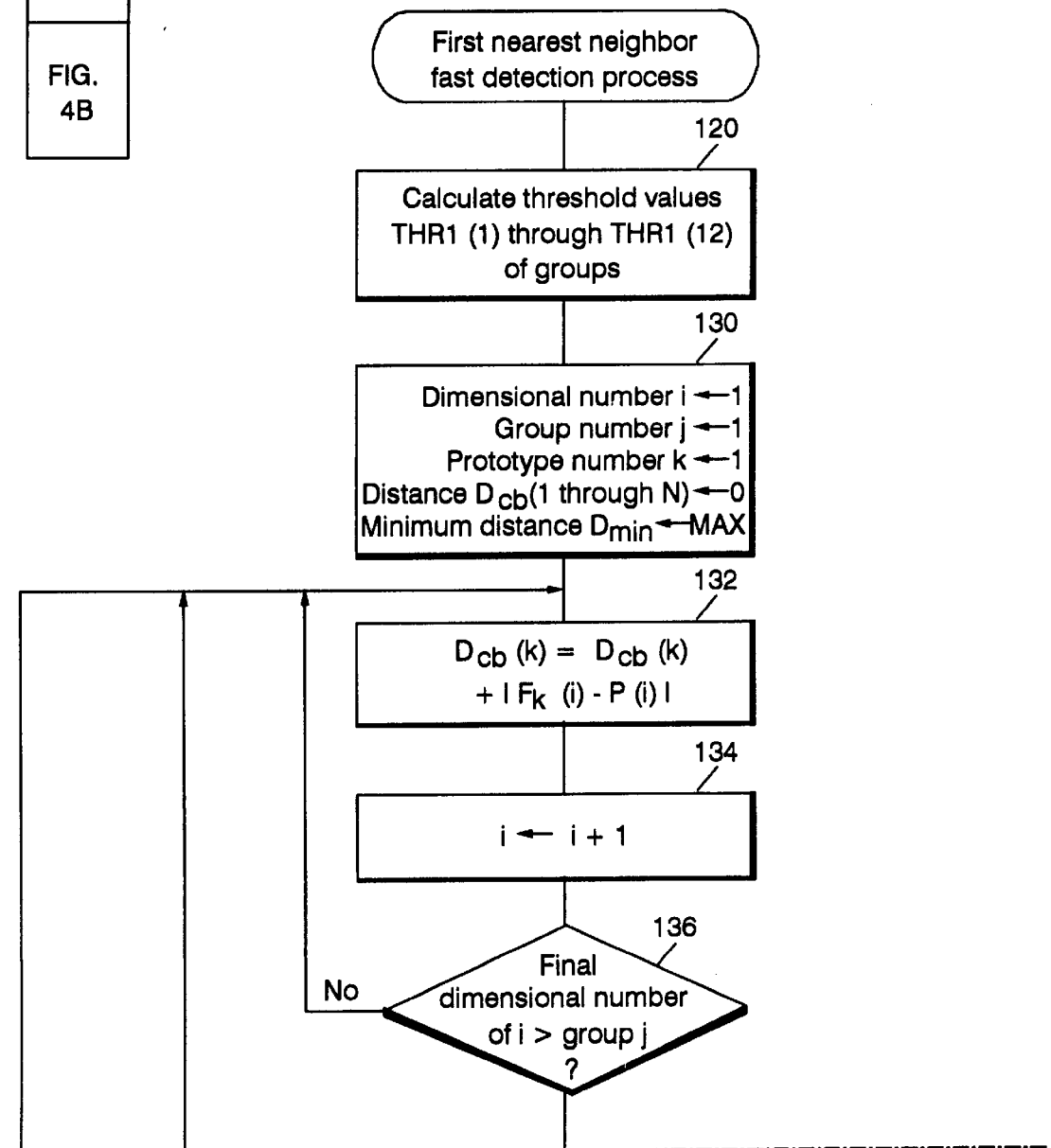

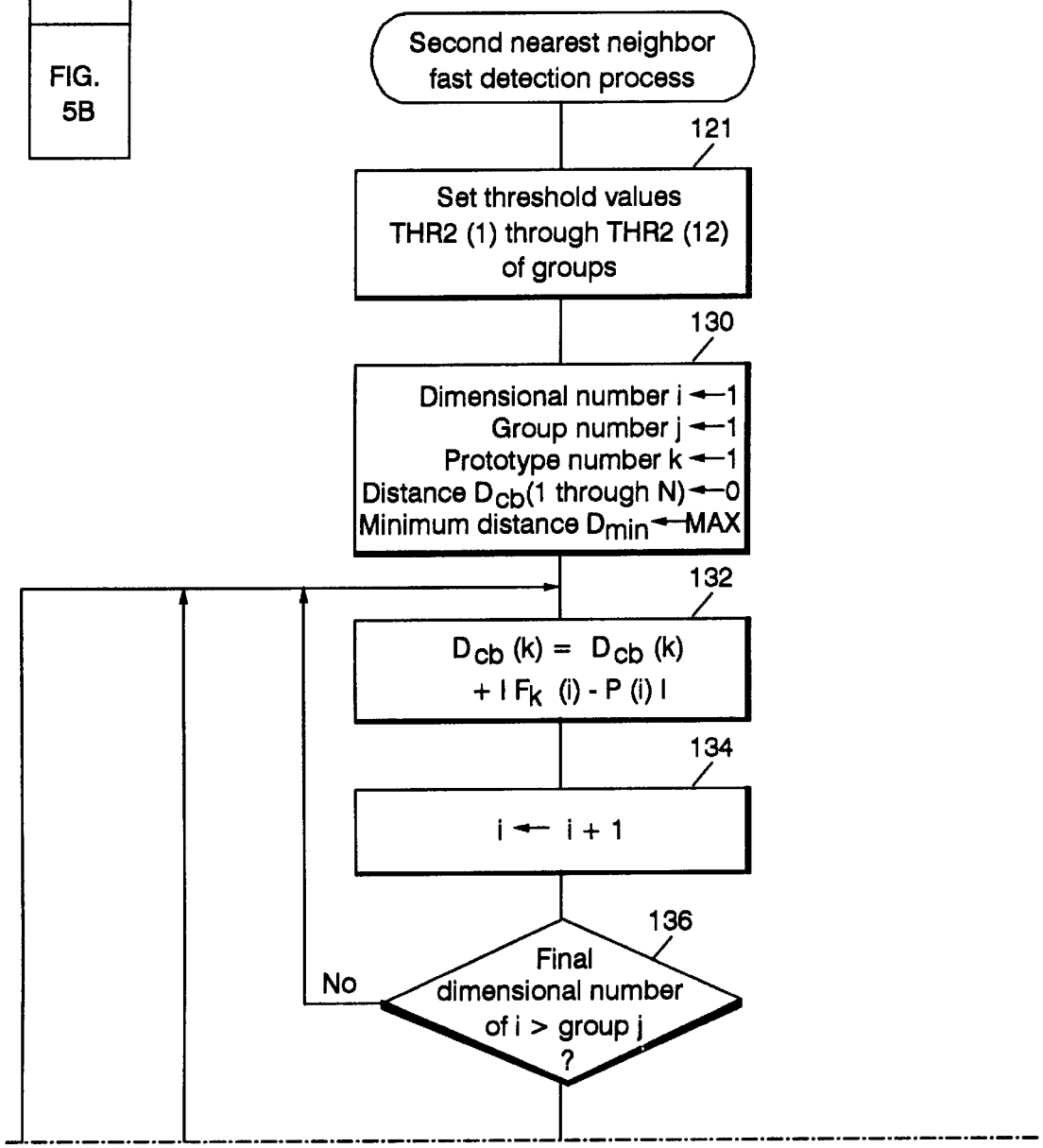

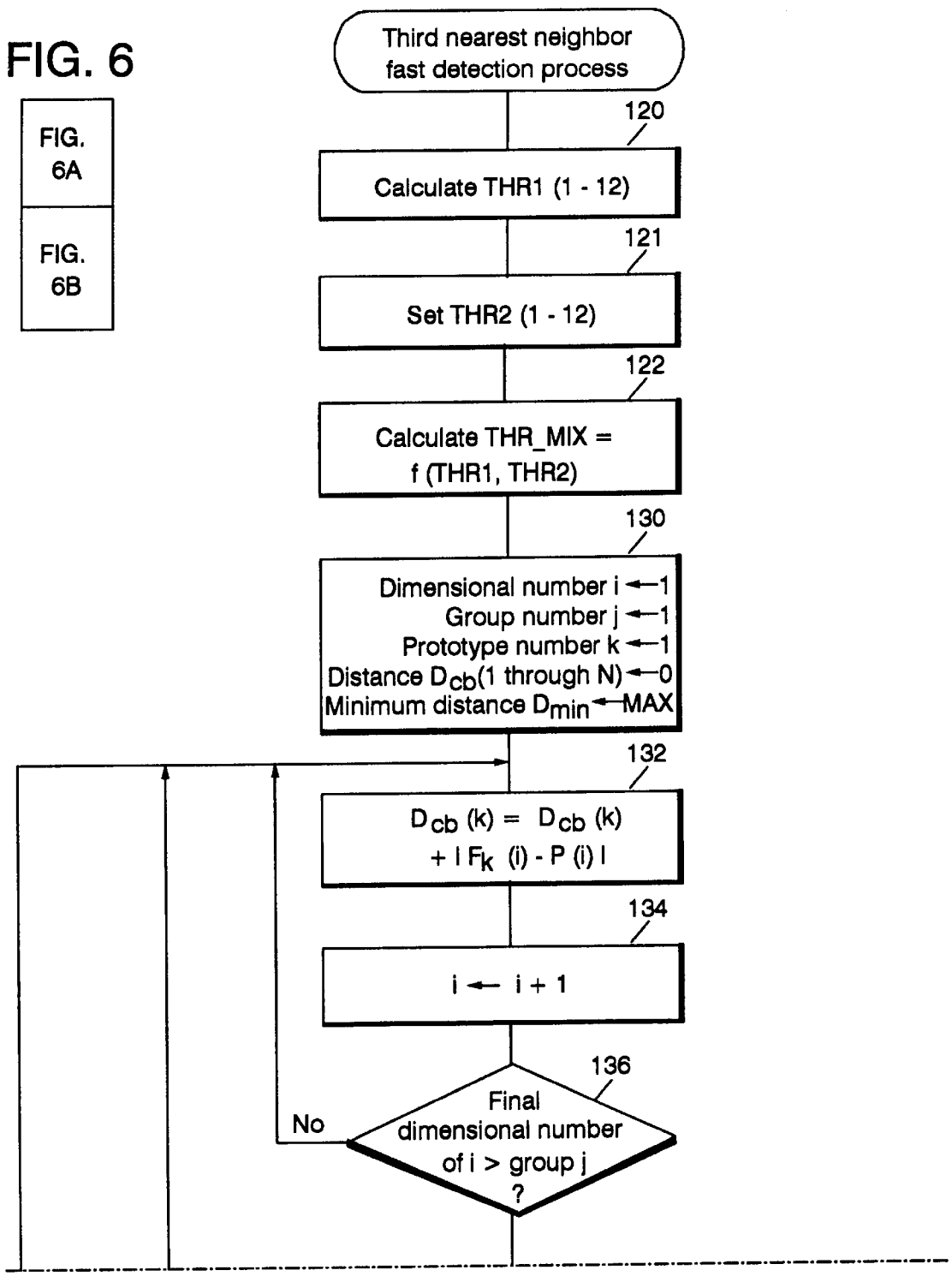

X: ACCUMULATED FEATURE

Y: DISTANCE BETWEEN A SHORTEST PROTOTYPE OF A CORRECT CATEGORY AND AN INPUT PATTERN

X: GROUP NUMBER

Y: DISTANCE, UP TO THE FEATURE OF A PERTINENT GROUP, BETWEEN A SHORTEST PROTOTYPE OF A CORRECT CATEGORY AND AN INPUT PATTERN

X: GROUP NUMBER

Y: DISTANCE UP TO A PERTINENT GROUP, BETWEEN A SHORTEST PROTOTYPE OF A CORRECT CATEGORY AND AN INPUT PATTERN +α
―――――――――――――――――――――――――――――――――――――――――――
THE SHORTEST DISTANCE TO THE PERTINENT GROUP +α

PATTERN RECOGNITION METHODS AND APPARATUS TO REDUCE PROCESSING TIME BY GROUPNISE COMPARISON OF FEATURES AND COORDINATED DYNAMIC ELIMINATION OF CANDIDATES

FIELD OF THE INVENTION

The present invention relates to a nearest neighbor fast detection method by which, in an N dimensional feature space that is occupied by multiple sampling points, the nearest sampling point to a point at which data are recently input is detected quickly by excluding, during calculation, any sampling point for which there exists a small possibility that it will be the nearest neighbor, and to a pattern recognition apparatus that employs such a detection method.

BACKGROUND OF THE INVENTION

In a large number of conventional software applications, high speed calculations are employed by which, in an N dimensional feature space (N is a natural number) that is populated by multiple sampling points, the sampling point is acquired that is the nearest to a point at which data (for N dimensional features) are input. The high speed calculations have been studied extensively, and one application of such calculations is for pattern recognition. When such calculations are employed for pattern recognition, sampling points are category prototype groups that are to be recognized, and an input point is a sampling point that is to be identified. When such employment involves the use of a character recognition apparatus, such as a so-called OCR (optical character reading) apparatus, a value for each dimension in the N dimensional feature space corresponds to a feature element value that is extracted from a character pattern. According to the easiest recognition method, a category to which sampling data (a neighbor) that is nearest to an input point is regarded as a recognition result.

For a small number of dimensions N (only several dimensions), there are some fast theoretical detection methods available. When the value of N becomes greater (e.g., several tens of dimensions or more), however, the number of calculations that is required to acquire distances between an input point and multiple sampling points drastically increases, and there are no theoretical methods that can accurately acquire a nearest point at high speed. Therefore, for an actual application, a trade-off between the speed that can be attained and the minimum reduction of a recognition rate is more important than a guarantee that the nearest point can be acquired.

Many detection methods have been devised for detecting a nearest neighbor point at high speed and with a high rate of success, within a range wherein the reduction in a recognition rate can be kept as small as possible. With these conventional detection methods, before or during the calculation of distances, sampling points for which there is very little possibility that they will be the nearest are excluded (i.e., screening is performed) in order to reduce the number of calculations and to provide high speed calculation. For example, for the employment mainly of features of 200 dimensions in the OCR apparatus, with one method screening is performed with a feature that is obtained by compressing 200 dimensions to 20 dimensions, and with another method screening is performed in advance with another, but easier, feature. Further, in "A Simple, Fast Recognition Method For Hierarchial Pattern Matching", (33rd National Conference Of Information Processing Academy, p. 1643 (1986); Sone, Kato and Takahashi) a method is disclosed by which, during the distance calculation for 200 dimensions, sampling points are compared with simple threshold values that are to be discarded, and screening is performed sequentially for those sampling points for which there is little possibility that they will be the nearest. The above described methods can be combined for effective use.

When using the above conventional nearest neighbor detection methods, a specific threshold value or a simplified feature quantity is employed to perform screening. If processing speed is sufficiently high, a sampling point that is a nearest neighbor will also be screened. If the screening requirements are relaxed to improve the detection rate for a nearest neighbor, an adequately high processing speed cannot be attained. In other words, the conventional technique cannot provide a satisfactory processing efficiency factor that is determined by a trade-off between the speed that can be attained and a minimum reduction at a recognition rate.

To overcome the above described shortcoming, it is one object of the present invention to provide a nearest neighbor, fast detection method by which the threshold value, for screening, is dynamically changed during the distance calculation in order to effect a dramatic increase in the processing efficiency, and that performs fast processing at a high recognition rate.

SUMMARY OF THE INVENTION

To achieve the above object, according to the present invention, a nearest neighbor, fast detection method, by which, in a feature space that is comprised of, for each dimension, a plurality of features that represent pattern attributes, distance values between an input pattern and feature patterns that are distributed across the feature space, are calculated, and the nearest neighbor pattern that has the minimum distance value is detected. The method comprises the steps of: sorting the plurality of features to a plurality of groups, with each group being composed of one, or two or more features; establishing a predetermined order for the plurality of groups; employing a quantity of information, which is related to the features of each of the plurality of groups, to set a first threshold value, which is in consonance with a distance value for each of the groups; calculating distance values to the groups in the feature space, for each of a plurality of patterns, according to the predetermined order; and excluding, from a target for a following distance calculation, a pattern for which the distance value to a specific group in the feature space is provided that exceeds the first threshold value for the specific group.

For example, a 192 dimension feature space is equally divided into 12 groups of 16 dimensions each. A distance value between an input pattern and a plurality of patterns is calculated sequentially in the partial feature space of each group, i.e., a feature space of 16 dimensions, 32 dimensions, . . . or 192 dimensions (the distance value to the last group is employed as a real distance value for the entire feature space). Therefore, as the quantity of information that concerns the feature or features of the group, which is, for example, the number of the features for which the distance calculation is performed, is increased, distance values become greater and the reliability of the obtained distance value is improved. In consonance with this change, the first threshold value is updated for each group based on the quantity of information that is concerned with the features of the individual groups, and a pattern for which a distance value that exceeds the value that is provided is excluded from the following calculation process (screening is performed). Compared with a conventional screening method in which a constant threshold value is employed, the removal of a real nearest point during the screening can be prevented, so that both a high rate of accuracy for the detection of the nearest neighbor and high speed processing can be provided. In other words, a processing efficiency effect is provided that is determined by a trade-off between the detection rate for the nearest neighbor and high speed processing. The first threshold value for each group needs only to be set based on a statistical property that is consonant with the feature of each group in the sampling groups to which an input pattern belongs. In addition, not only the pattern that is the nearest neighbor, but also the second, or the third, or the . . . nearest pattern can be detected.

A nearest neighbor fast detection method, by which, in the feature space that is constituted by, for each dimension, a plurality of features that represent pattern attributes, distance values between an input pattern and feature patterns that are distributed across the feature space are calculated, and the nearest neighbor pattern that has the minimum distance value is detected, comprises the steps of: sorting the plurality of features to a plurality of groups, with each group being composed of one, or two or more of the features; establishing a predetermined order for the plurality of groups; employing a quantity of information, which is related to the features of each of the plurality of groups, to set a first threshold value, which is in consonance with a distance value for each of the groups; calculating distance values to the groups in the feature space for the plurality of patterns, and acquiring, for each of the plurality of groups, a minimum value for distances between each group and the feature patterns across the feature space; excluding, from succeeding processing, a pattern for which a distance value to a specific group in the feature space is provided that exceeds the first threshold value for the specific group; employing the minimum value along with other distance values for the groups to set a second threshold value for the specific group, for which pattern exclusion is performed in consonance with the first threshold value; and excluding, from succeeding distance calculation, a pattern for which a distance value to the specific group in the feature space is provided that exceeds the second threshold value.

The invention cited in claim 2 performs screening at two levels, while the invention cited in claim 1 performs screening at a single level. More specifically, screening is performed for a pattern whose distance value to each group in the feature space exceeds the first threshold value, and, for the group for which the first screening is performed, a second threshold value is set that is based on the minimum distance value that is derived from the distance values between that group and a plurality of patterns. Then, screening is performed for a pattern for which the distance value to that group exceeds the second threshold value. In the second screening, the pattern that was excluded in the first screening accordingly is not processed during the second screening. Since the result that is obtained by the calculations that are performed during the first screening is employed to perform the second screening, the time required for processing is not substantially affected by the additional screening, and the effects obtained by the two screening processes complement each other and increase the processing speed. Since the reliability of distance values obtained by the distance calculations increases as the distance to the last group decreases, the second threshold value that is set is based on the minimum value, so that the ratio of the second threshold value to the minimum value is small and the screening is performed more effectively. The second threshold value, for the sampling group to which an input pattern belongs, must be set based on the statistical properties that are consonant with the features of each group.

A cumulative quantity of features, which is obtained by adding together, in the predetermined order, quantities of features for the input pattern until the limits for the groups are reached, is employed as the information quantity to set the first threshold value for each of the groups.

The first threshold value, an information quantity that is related to the feature of the group that is to be employed, is set as a mathematical function for a cumulative quantity of features, which is not directly related to the number of dimensions that is being calculated. For example, when the cumulative quantity of features for the input pattern for the groups is small, the value set for the first threshold value is small. When the cumulative quantity of features is large, the value set for the first threshold value is large. Through this process, the possibility can be avoided that, when the cumulative quantity of features is large, the distance to the nearest neighbor will be too great and the nearest neighbor will therefore be removed during the screening process. In addition, the processing efficiency can also be increased.

The cumulative number of features, which is obtained by adding together in the predetermined order the features for the groups, is employed as the information quantity that is used to set the first threshold value for each of the groups.

The first threshold value is set as a mathematical function for the number of feature dimensions of the groups. As the number of calculated dimensions increases, the distance to each group increases at a constant rate; the possibility is avoided that as the number of calculated dimensions becomes smaller the reliability of distance values will be reduced; and the processing efficiency can be enhanced.

A cumulative quantity of features, which is obtained by adding together in the predetermined order quantities of features for the input pattern until the limits of the groups are reached, and the cumulative number of features, which is obtained by adding together in the predetermined order the number of features for the groups, are employed as the quantity of information to set the first threshold value for each of the groups.

The first threshold value is set as a mathematical function of a sum for two different threshold values. The combining of the threshold values substantially increases the reliability of the first threshold value, and processing efficiency is further enhanced. The two different threshold values are, for example, a non-linear function value and an average weight function value.

An average value for the cumulative quantity of features and the cumulative number of the features is set as the first threshold value for each of the groups.

An average value, which is obtained by performing the easiest process, is used to acquire the first threshold value, so that the number of calculations is increased as little as possible and the processing efficiency is enhanced.

The predetermined order that is established for the groups is in consonance with a degree of dispersion for the quantity of features that is found in each of the groups.

Calculation begins with a group that has an important feature that contributes the most to a sorting calculation. The dispersion value for the quantity of features is employed as a reference for the degree of importance. Thus, the effect that is provided by screening is enhanced, and distance calculation can be preformed faster.

The pattern recognition apparatus comprises: input means for inputting an input pattern; feature extraction means for extracting a plurality of features from the input pattern that is input by the input means; storage means for storing prototypes, which are prepared in advance for each recognition category and which are expressed by using the plurality of features; distance calculation means for sorting the plurality of features into a plurality of groups, with each group being composed of one, or two or more features, and for acquiring, for each of a plurality of patterns, the distance value to each of the groups in the feature space in consonance with the predetermined order, which is established for the groups; first threshold value setting means for employing the information quantity that is related to the feature of the groups in order to set the first threshold value, which is related to the distance value, for each of the plurality of groups; first screening means for excluding from succeeding distance calculation a prototype that provides the distance value when the value, which is to a specific group in the feature space and which is obtained by the distance calculation means, exceeds the first threshold value of the specific group; nearest neighbor detection means, for detecting a prototype, which at least provides the minimum distance value in the feature space as a whole, for which calculation of features for a final group is completed by the distance calculation means; and recognition means for employing a recognition category, which includes the prototype that is detected by the nearest neighbor detection means, to determine the recognition category to which the input pattern belongs.

The pattern recognition apparatus comprises: input means for inputting an input pattern; feature extraction means for extracting a plurality of features from the input pattern that is input by the input means; storage means for storing prototypes, which are prepared in advance for each recognition category and which are expressed by using the plurality of features; distance calculation means for sorting the plurality of features into the plurality of groups, with each group being composed of one, or two or more features, and for acquiring, for each of a plurality of patterns and in a predetermined order, the distance value to each of the groups in the feature space; first threshold value setting means for employing an information quantity that is related to the features of the groups to set the first threshold value, which is related to the distance value, for each of the plurality of groups; first screening means for excluding from succeeding distance calculations a prototype that provides the distance value when the value, which is to a specific group in the feature space and which is obtained by the distance calculation means, exceeds the first threshold value of the specific group; minimum value acquisition means for acquiring, for each of the groups, minimum values for distances between the prototypes and the groups in the feature space; second threshold value setting means for employing, for each of the groups, the minimum value, which is acquired by the minimum value acquisition means for each of the groups, to set a second threshold value; second screening means for, before distance calculation shifts to a following group, excluding from succeeding distance calculation a prototype whose distance value to the following group in the feature space exceeds the second threshold value of the group, for which prototype screening is performed by the first screening means; nearest neighbor detection means for detecting a prototype that at least provides the minimum distance value, across the entire feature space, for which calculation of features for a final group is completed by the distance calculation means; and recognition means for employing a recognition category, which includes the prototype that is detected by the nearest neighbor detection means, to determine the recognition category to which the input pattern belongs.

The first threshold value setting means employs, as the information quantity, a cumulative quantity of features, which is obtained by adding together, in the predetermined order, quantities of features for the input pattern until the limits for the groups are reached, to set the first threshold value for each of the groups.

The first threshold value setting means employs, as the information quantity, a cumulative number of features, which is obtained by adding together, in the predetermined order, the number of the features for the groups, to set the first threshold value of each of the groups.

The first threshold value setting means employs, as the quantity of information, a cumulative quantity of features, which is obtained by adding together, in the predetermined order, quantities of features for the input pattern until the limits of the groups are reached, and a cumulative number of features, which is obtained by adding together, in the predetermined order, the number of features for the groups, to set the first threshold value for each of the groups.

The first threshold value setting means sets an average value for the cumulative quantity of features and the cumulative number of the features as the first threshold value for each of the groups.

The predetermined order that is established for the groups is in consonance with the degree of dispersion for the quantity of features that is found in each of the groups.

Since the nearest neighbor can be detected quickly and accurately, an input pattern can be recognized quickly and an enhanced recognition rate that is very correlated with a detection rate for the nearest neighbor is provided.

BRIEF DESCRIPTION OF THE DRAWINGS

For a more complete understanding of the present invention, and for further advantages thereof, reference is now made to the following Detailed Description taken in conjunction with the accompanying drawings in which:

FIG. 4A–B is a flowchart showing a first example for a nearest neighbor fast detection process that is performed with the OCR arrangement according to an embodiment of the present invention;

FIG. 5A–B is a flowchart showing a second example for a nearest neighbor fast detection process that is performed with the OCR arrangement according to an embodiment of the present invention;

FIG. 6A–B is a flowchart showing a third example for a nearest neighbor fast detection process that is performed with the OCR arrangement according to an embodiment of the present invention;

DESCRIPTION OF THE PREFERRED EMBODIMENT

Figure 1:
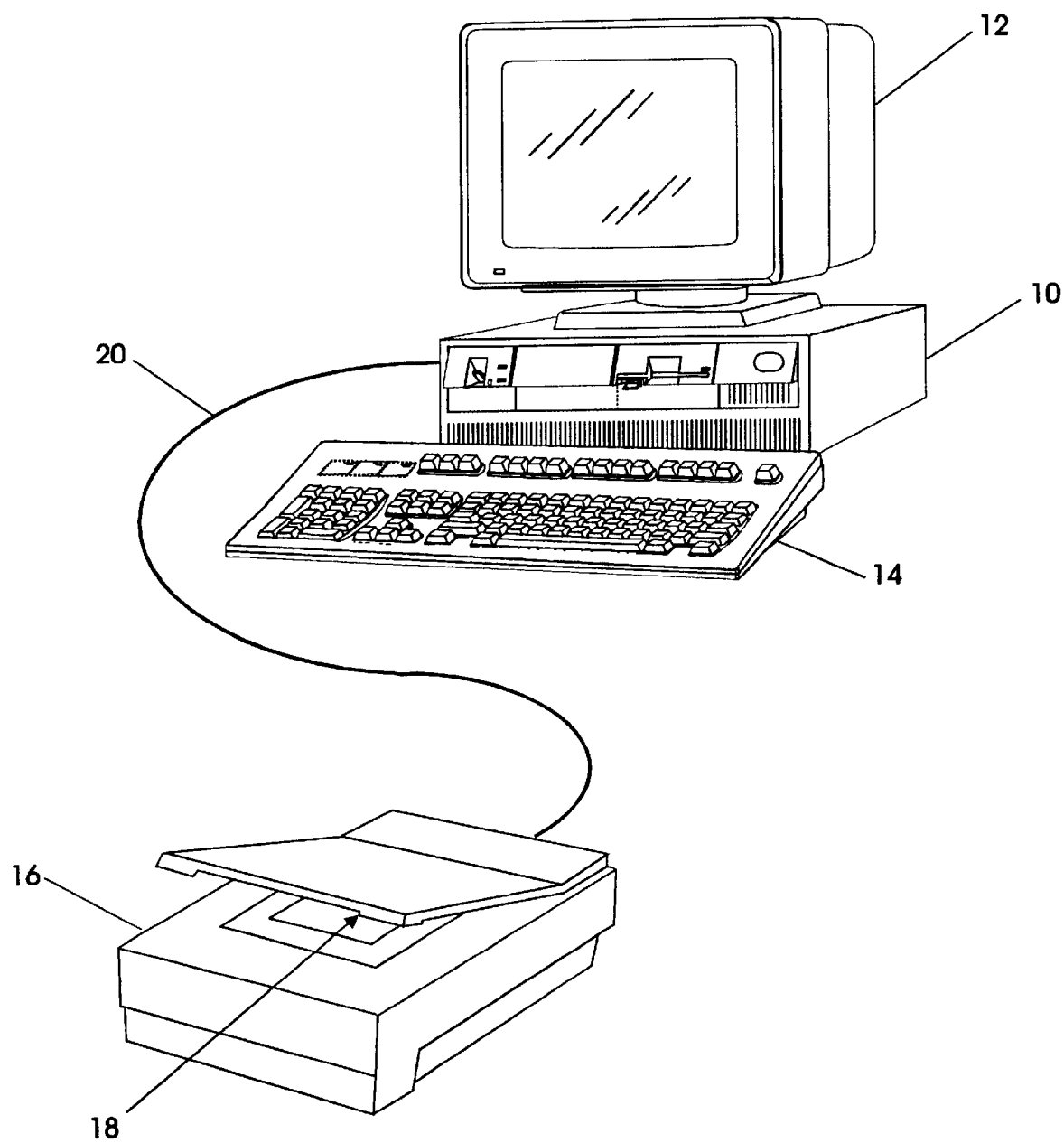
FIG. 1 is a diagram illustrating a system structure example for an OCR process according to one embodiment of the present invention.

FIG. 1 is a diagram illustrating the system arrangement example for an OCR process according to an embodiment of the present invention. As is shown in FIG. 1, the OCR system in this embodiment comprises a personal computer 10 that executes the processing that is required for character recognition; a CRT 12 that displays the character recognition results; a keyboard 14 that serves as an input means for an operator; and a scanner 16 for the input of images. To recognize characters, the OCR system employs the personal computer, which in turn employs a character recognition program. The scanner 16 irradiates an OCR form 18 with light and scans it, quantizes the reflected light to obtain binary values, and outputs digital image data for the OCR form 18. The scanner 16 is connected via a cable 20 to the personal computer 10.

Figure 2:
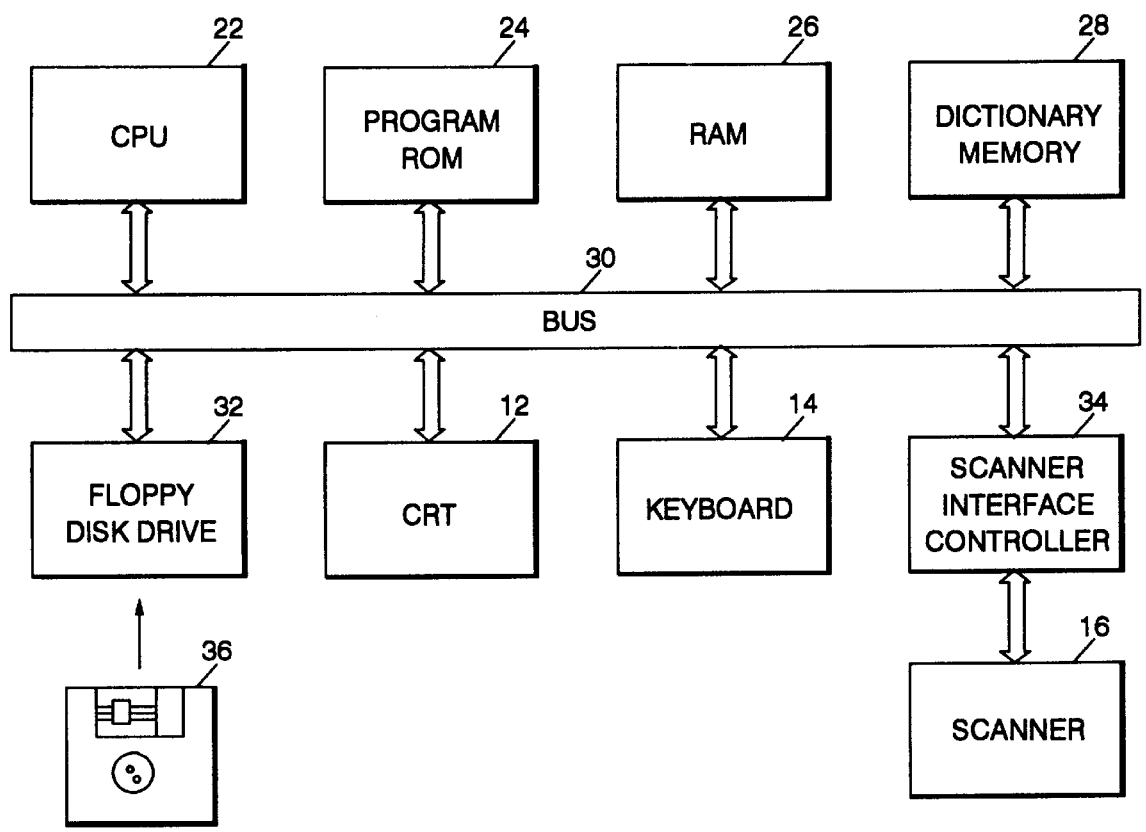
FIG. 2 is a block diagram illustrating the arrangement for an OCR process according to an embodiment of the present invention.

FIG. 2 is a block diagram illustrating the arrangement of the OCR system. As is depicted in FIG. 2, the OCR system comprises a CPU 22 that executes a given program to control the individual sections that will be described later; a program ROM 24 that is employed to store a control program that the CPU 22 uses; and a RAM 26 that is employed as a work area for the CPU 22 and as a storage area for digital image data. These components are connected to a bus 30 across which data and commands are transmitted.

Also connected to the bus 30 is a dictionary memory 28 that is employed to store quantities of features for a plurality of typical character patterns (prototypes), which are prepared for each category that is a target for character recognition. The dictionary memory 28 is accessed by the CPU 22. The prototypes for each category of feature vectors are acquired by the clustering, which will be described later, of an extremely large number of character patterns. The dictionary memory 28 is designed and constituted as a magnetic disk device that is incorporated in the personal computer 10. The dictionary memory 28 may also be constituted as an external magnetic disk device or as a magneto-optical disk device.

A floppy disk drive 32 that accesses an inserted floppy disk 36 to read or write data, the CRT 12, the keyboard 14, and a scanner interface controller 34 that controls an interface with the scanner 16 are connected to the bus 30.

When the thus arranged OCR system is employed to perform character recognition, an operator activates the personal computer and positions on the scanner 16 the OCR form 18 on which are written characters for recognition. Then, the operator inserts the floppy disk 36, on which the character recognition program is stored, into the floppy disk drive 32 and instructs a recognition operation at the keyboard 14. In response to this, the floppy disk drive 32 reads the character recognition program that is recorded on the floppy disk 36, and transmits the data, via the bus 30, to the CPU 22, which in turn executes the character recognition program while controlling the individual components during the character recognition program.

Figure 3:
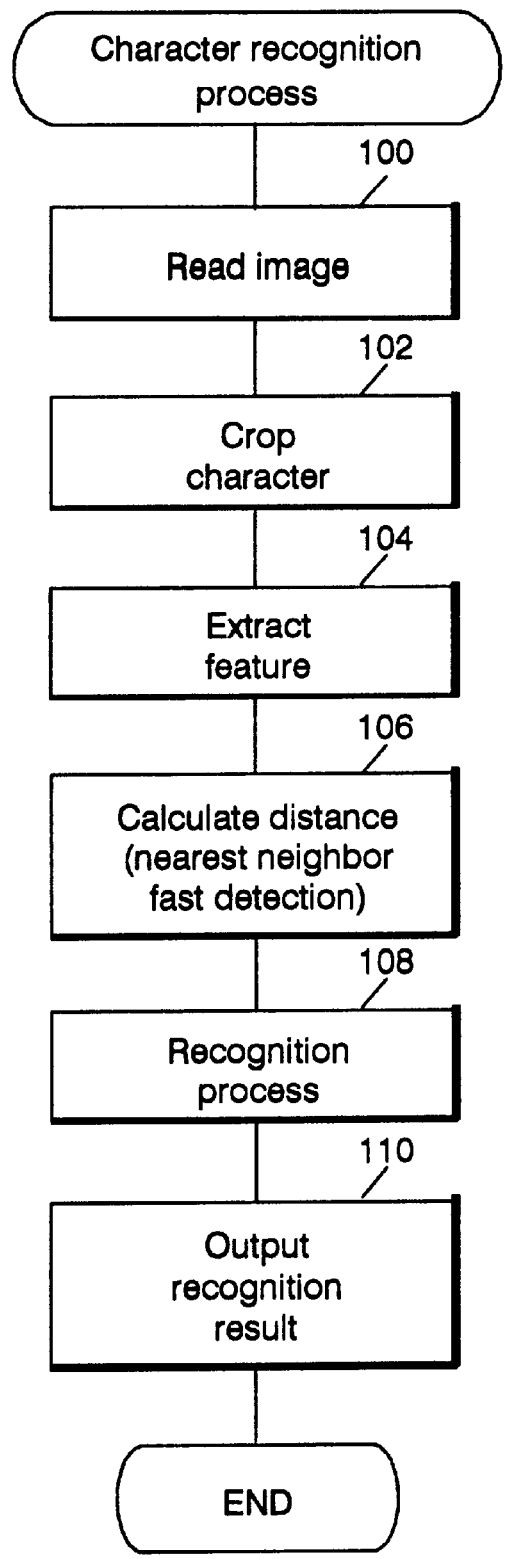
FIG. 3 is a flowchart for character recognition processing with the OCR arrangement according to an embodiment of the present invention.

The character recognition process will now be explained while referring to the flowchart in FIG. 3. As is shown in FIG. 3, the scanner 16 scans an image on the OCR form 18 and converts it into digital image data (step 100). The digital data is transferred, via the cable 20, to the bus 30 by the scanner interface controller 34, and are thereafter stored in the RAM 26.

A character area is extracted from the digital image data that is stored in the RAM 26 and individual character patterns are cropped from the other image areas (step 102). In the process for extracting the character areas, positions of a character frame area on the OCR form 18 are given in advance to the character recognition program, and the CPU 22 identifies the position and executes the extraction processing. In the process for cropping character patterns, the four corners of the character pattern are detected, an external frame that consists of sides that pass through these four corners is acquired, and the data inside the frame are extracted as an input pattern.

The quantity of features for the cropped input pattern is extracted, and a feature vector is prepared, which sufficiently reflects the feature of the input pattern and which includes compressed information (step 104). The following process is performed for extraction of the quantity of features.

First, the input pattern is normalized to obtain a vertically and horizontally identical size, i.e., 60 dots×60 dots. Then, the normalized input pattern is changed to fine lines. The fine line method that is used is, for example, the Hilditch method. The fine line pattern is divided into, for example, 12 blocks relative to four look (projection) directions. Connective elements are counted in every direction for each block, and the count results are employed as feature values for dimensions to prepare a multiple-dimensional vector. The four look angles are vertical and horizontal projection angles, and 45 degree right diagonal and left diagonal angles. The number of connective elements in the 12 blocks in the fine line pattern are counted in each direction. The connective elements are right, lower, right diagonally lower, and left diagonally lower adjacent points relative to black dots that constitute the fine line pattern. When dots are block dots that are adjacent to each other, a value in either direction is incremented by 1. The counted value is weighted according to the connective element direction and the look angle. The contribution of the quantities of features is smoothed. By using the above described feature extraction method, feature vectors are prepared for 4 (the number in the connective element direction) 12 (the number of divisions) 4 (the look angles)=192 dimensions. Hereafter, an explanation will be given by employing feature vectors for the 192 dimensions.

Following this, a distance between a feature vector for an input pattern and a prototype character pattern that is stored in the dictionary memory 28 is calculated. The prototype that is at the shortest distance (the nearest neighbor) is detected and the category to which that prototype belongs is extracted as a recognition selection (step 106). In order to improve a recognition rate, not only the category for the nearest neighbor but also categories for several prototypes may be extracted in order, beginning with the shortest distance, as recognition selections.

At step 106, to obtain the simplest city block distance $D_{cb}$, the distance between the input pattern and the prototype is calculated as follows:

$$D_{cb} \sum_{i=1,192} (|P_i F_i|) \tag{1}$$

$P_i$ indicates the i-th feature value of a feature for a specific prototype, and $F_i$ is the i-th value of a feature for an input pattern. This city block distance is employed as an example for the following explanation. If the similarity of the input pattern to the prototype is represented, the distance to be employed is not limited to this example, and may, for example, be a so-called Euclidean distance.

Suppose that about 2800 categories, which cover hand written Chinese characters, hiragana (the cursive Japanese syllabary), katakana (the relatively angular Japanese syllabary), numbers, alphabets and special characters, are selected as recognition targets, and that 8283 prototypes are prepared, with an average of three for each category. To detect the true nearest neighbor vectors of features for the input pattern and for all the prototypes must be calculated by employing expression (1), and thus an extremely large amount of calculations must be performed. In this embodiment, however, the nearest neighbor fast detection process is performed at step 106 to perform fast processing with no substantial degradation of the nearest neighbor detection rate. In the nearest neighbor fast detection process, the features for 192 dimensions are sorted to a plurality of groups. Distance values that are obtained by the calculation in order, of the individual groups are smaller than the threshold value, which is dynamically changed in the calculation process. The prototypes that possess those distance values are screened sequentially before the following distance calculation is performed. The details will be explained later.

The recognition process is performed to select the final recognition result from the choices that are extracted at step 106 (step 108). During the recognition process, the codes for the recognition choices, for example, are compared with a word dictionary that is prepared in advance. The results of this comparison or the context information for the preceding and the succeeding words is employed to eliminate an improbable recognition choice. In this manner, an optimal recognition choice can be made. Thus, the recognition rate can be improved when compared to one that is obtained with the method by which a category that simply includes the nearest neighbor is selected as the recognition result. The prevention of a reduction in the recognition rate, which is the final purpose, is well correlated with the maintenance of the nearest neighbor detection rate. By performing the nearest point fast detection process at step 106, high speed processing accompanied by a high recognition rate can be achieved.

When the final recognition result is obtained, the result is output (step 110) and the character recognition process is thereafter terminated. The recognition result is output to a storage device, such as a magnetic disk device, to prepare a database. Or, the recognition result may be displayed on the CRT 12 so that an operator can check it and make necessary corrections.

The nearest neighbor fast detection process at step 106 will now be explained in detail.

Before the distance calculation, it is preferable that the quantities of features for 192 dimensions be arranged in advance in an order that ensures screening be effectively performed. In this embodiment, the individual dispersion values for the quantities of features for 192 dimensions are calculated by employing 8283 prototypes, which are stored in the dictionary memory 28, with the quantities of their features being arranged in the descending order of dispersion values, and with distance calculations being performed in that order. This rearrangement is desirable because a quantity of features for which the dispersion value is large contributes greatly to the sorting calculation, and convergence (screening) can be performed early when calculation is conducted in that order.

The quantities of features of the 192 dimensions, which are arranged according to the descending order of the dispersion values, are sequentially sorted and assembled to provide 12 groups of 16 dimensions each. The number of dimensions that are assigned to one group and the number of groups that are provided are not limited to this example; the 192 dimensions may be sorted and assembled to provide 24 groups of eight dimensions each, for example.

In the nearest neighbor fast detection process, the threshold value for screening is dynamically changed for each group. There are various modes that are related to the procedures for setting a threshold value and to how to employ the threshold value that is set for screening. In this embodiment, therefore, the first through fourth examples of the nearest neighbor fast detection process are employed and will be explained while referring to FIGS. 4 through 7, respectively.

Figure 4B:
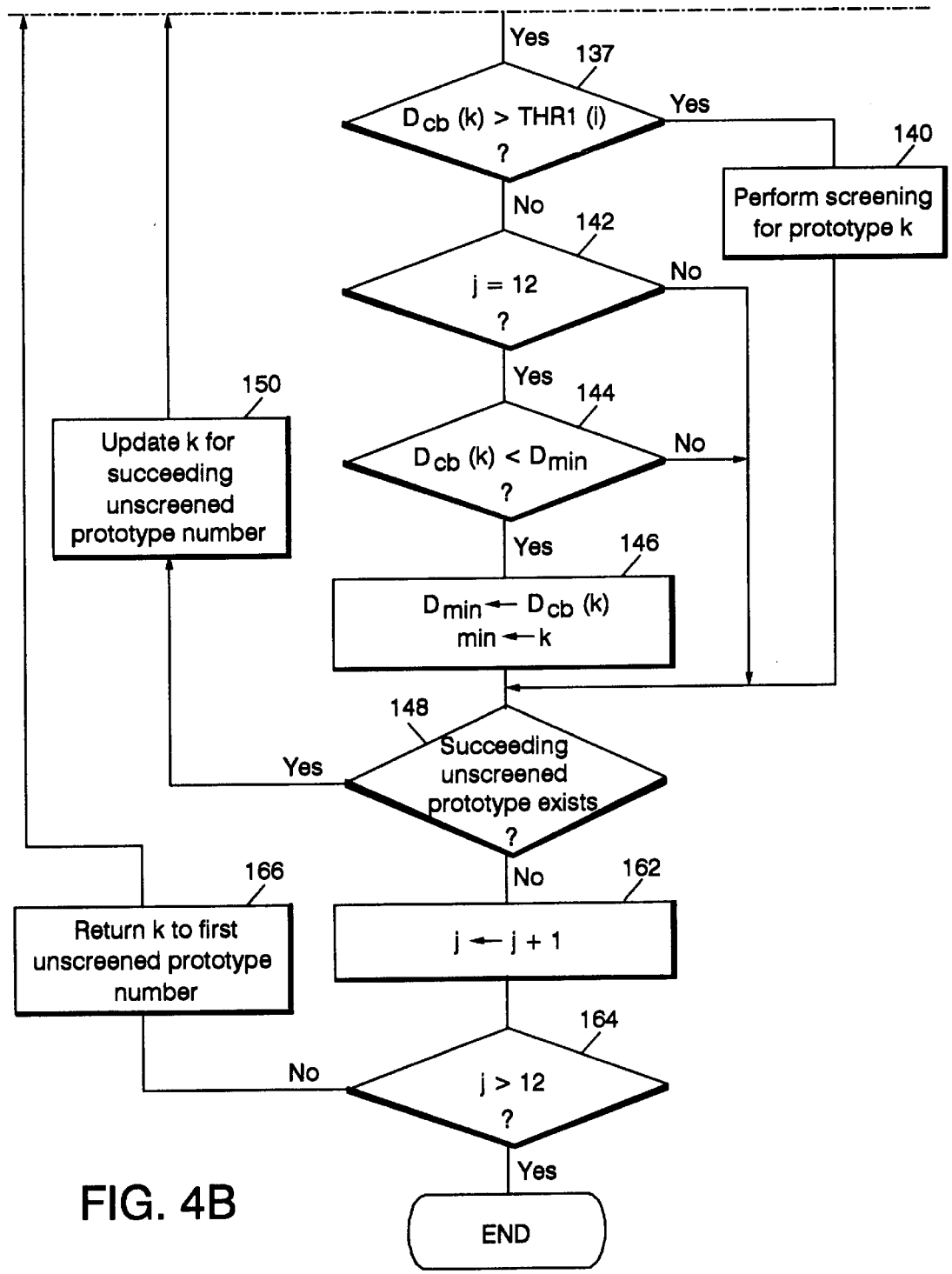

As is shown in FIG. 4, in the first example for the nearest neighbor fast detection process, first, threshold values TRH1 (1) through TRH1(12) (THR1(1–12)) are calculated for the individual groups 1 through 12 (step 120). These threshold values THR1(1–12) are set based on the cumulative quantities of the features for the input patterns that are acquired before the limits of a group are reached. For example, while the cumulative quantities of features are small, the set threshold values THR1(1–12) are small. As the quantities become larger, the set threshold values THR1(1–12) are increased. In other words, the individual values THR1(1–12) are mathematical functions of the cumulative quantities of the features. The cumulative quantities of the features that are acquired before the limits of a group are reached is the sum of the values of the 192 dimensions for the features, for a pattern that is added to the final dimension (16, 32, . . . , 192). As will be explained later, prototypes for which distances that are acquired for individual groups exceed their own threshold values THR1(1–12) are sequentially excluded from the following distance calculations.

For the following reason, the settings for the threshold values THR1(1–12) are based on the cumulative quantities of features that are not directly related to the number of dimensions employed for the distance calculations. With the feature that is extracted at step 104, since the character strokes are not normalized, the distance is not increased between the different character types that have few strokes, while the distance is increased between the same character types that have many strokes.

Figure 8:
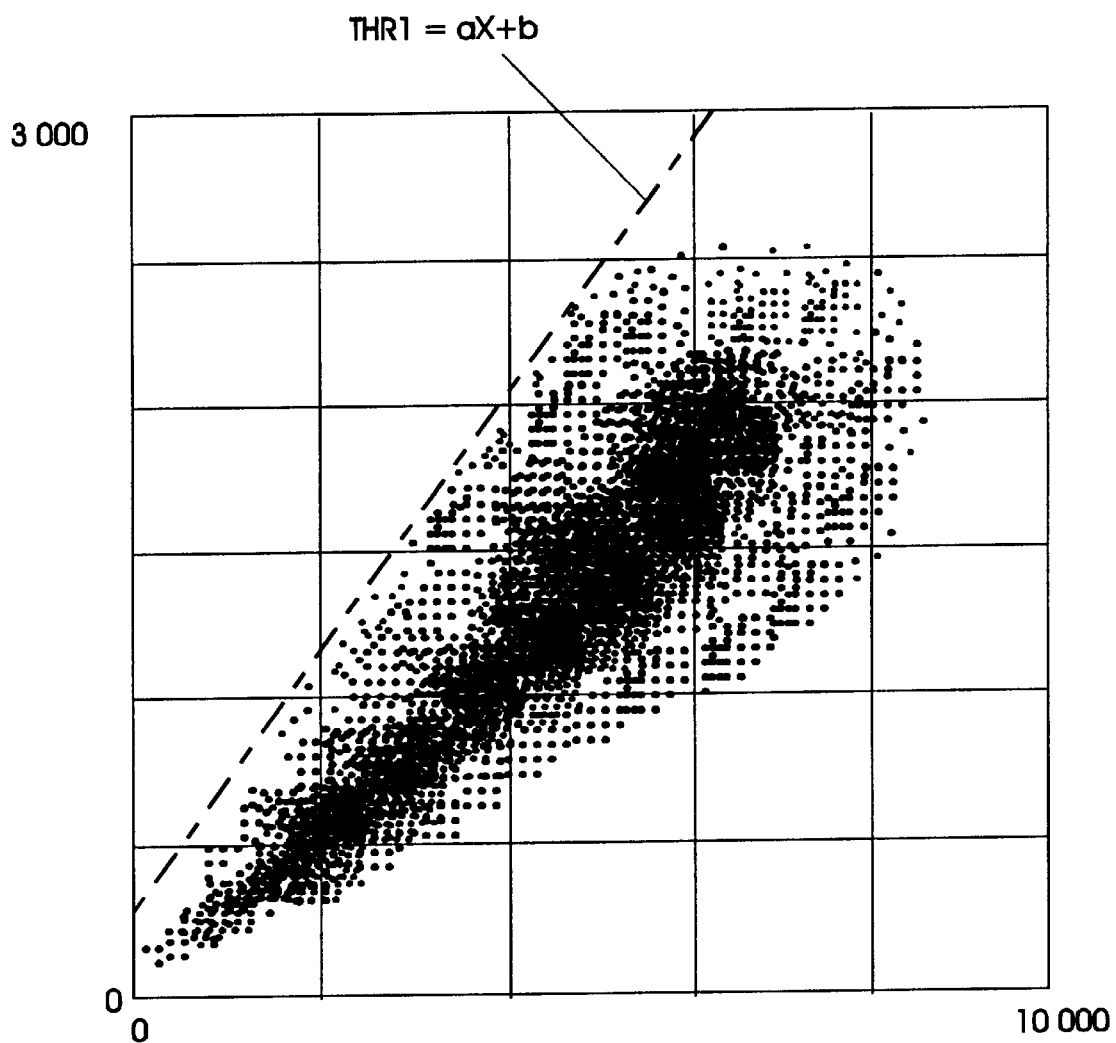
FIG. 8 is a graph on which are plotted multiple experimental samples, which concern a relationship between the quantity of features for input patterns that is accumulated up to the number of a pertinent group, and a city block distance between the input pattern and a prototype of a correct category, to determine a threshold value THR1.

A specific method for setting threshold values THR1 (1–12) is, for example, the following method, which is based on a graph in FIG. 8, wherein data that were acquired during an experiment are plotted. In FIG. 8, the X axis represents a cumulative quantity of features that is acquired before the limits of a given group are reached, and the Y axis represents a distance value between an input pattern and a prototype, which is nearest to an input pattern, that is included in a category to which the input pattern belongs. The data are plotted for multiple character patterns. Further, in FIG. 8 a straight line that is acquired by the following expression is indicated as a function expression that yields the threshold values THR1(1–12). Based on the cumulative feature quantity X:

$$THR1(n) = a \cdot X(n) + b \quad (2)$$

wherein a and b are positive constants, n is a group number, and X(n) is a cumulative distance value that is acquired before the limits of group n are reached. As is shown in FIG. 8, for the straight line represented by expression (2), a and b are so set that most of the dispersed points are located below the line. If the straight line is located above all the dispersed points, a recognition rate for the data that are employed in this experiment can not be reduced by screening.

In expression (2), b must be a given positive value or greater. There are many small cumulative feature quantities X, for which calculation is performed only to 16 dimensions or to 32 dimensions, and sorting is conducted beginning with the feature that has a largest dispersed value. If b is near 0, therefore, a prototype in a correct category might be removed as a result of the screening. Instead of an easy linear function, as in expression (2), a non-linear function may be employed that more exactly reflects the distribution of dispersed points. The value "1" is set sequentially for dimension numbers I that designate dimensions 1 through 192, group numbers j that designate 12 sorted groups, each of which includes 16 dimensions, and prototype numbers k that designate all the prototypes, 1 through N (8283) (step 130). Further, the city block distance, which is based on expression (1), between an input pattern and one of the prototypes 1 through N is $D_{cb}$ (1) to $D_{cb}$(N). Initially these city block distances are set to 0, and the minimum distance $D_{min}$ is set to a maximum value (e.g., 65536) (step 130).

The distance between the input pattern and each of the prototypes is calculated with the following expression (step 132).

$$D_{cb}(k) = D_{cb}(k) + |F_k(I) - P(I)| \quad (3),$$

wherein $F_k(I)$ is the value of the feature for the I-th dimension (dimension I) of the k-th prototype (prototype k), and P(I) is the value of the feature for dimension I of the input pattern. Since initially I=1 and k=1, the city block distance between the first feature value for the first prototype and the first feature value for the input pattern is calculated and added to $D_{cb}(k)$.

Then, dimension number I is incremented by 1 (step 134), and a check is performed to determine whether or not I is greater than the final dimension number in the j-th group (group j) (step 136). In this embodiment, the dimension numbers for groups 1, 2, ..., 12 are 16, 32, ..., 192, respectively.

When I is not greater than the final dimension number in group j (negative decision at step 136), program control returns to step 132 and the above described processing is repeated. In other words, at steps 132 through 136, the city block distance that is associated with the value of the feature for the group j is added to $D_{cb}(k)$.

When I is greater than the final dimension number in group j (affirmative decision at step 136), the following expression is employed to determine whether or not the city block distance $D_{cb}(k)$ that is calculated up to the last dimension in group j is greater than the threshold value THR1(j) for the group j (step 137):

$$D_{cb}(k) > THR1(j) \quad (4)$$

When expression (4) is established (affirmative decision at step 137), the prototype k is screened (step 140) and program control shifts to the next process (step 148). In other words, the prototype k is excluded from the succeeding distance calculation. Referring to FIG. 8, when expression (4) becomes true, it means that the prototype k is located in an area above the straight line that is calculated by expression (2), where almost no dispersed points exist. Therefore, it is not very likely that a correct solution can be obtained with such a prototype. The screening out of that prototype does not have an adverse effect on the recognition rate, and the succeeding distance calculation can be performed quickly.

When expression (4) is not established (negative decision at step 137), the minimum distance and the nearest prototype are acquired by the following process. First, a check is performed to determine whether or not group number j is the last group number, 12 (step 142). Only when j is the last group number, 12 (affirmative decision at step 142), is the following expression employed to determine whether or not the city block distance $D_{cb}(k)$ is smaller than the minimum distance $D_{min}$ that is most recently acquired (step 144):

$$D_{cb}(k) < D_{min} \quad (5)$$

When expression (5) is established (affirmative decision at step 144), the value for $D_{min}$ is altered to the value for $D_{cb}(k)$, and the value for the nearest number min, which designates the nearest prototype number, is altered to the value for k (step 146).

When j is not the last group number, 12 (negative decision at step 142), program control immediately shifts to the next process (step 148) because the true nearest point can not be detected during the currently performed distance calculation. When expression (5) is not established (negative decision at step 144), program control also immediately shifts to the succeeding process (step 148).

When the process up to group j is completed for the prototype k in the above described manner, a check is performed to determine whether or not there is an immediately succeeding prototype that has not been screened (step 148).

When there is an immediate succeeding prototype that has not been screened (affirmative decision at step 148), the number for a succeeding prototype that has not been screened is updated to k (step 150). Program control then returns to step 132, and distance calculation is performed and a screening decision is made in the same manner as for the updated prototype. Since, in the processing for the first group 1, the prototype that immediately succeeds prototype k has not yet been shifted for the screening determination at step 137, k is merely incremented by 1 and updated to k+1. At the time the processing for group 1 and the following groups is performed, prototype k+1 may be screened out. In such a case, the number of the screened out prototype is skipped and the first prototype number that has not been screened out is selected.

When there is no succeeding prototype that has not been screened (negative decision at step 148), the process for group j is terminated, and group number j is incremented by 1 in order to shift to the process for the succeeding group (step 162).

A check is then performed to determine whether or not group number j is greater than the number for the last group, 12 (step 164). When group number j is not greater than group number 12 (negative decision at step 164), the number held by k is changed to the number of the first prototype that has not been screened (step 166) and program control returns to step 132 to repeat the above described processing. In other words, the distance calculation, screening, etc., are performed for the first succeeding prototype that has not been screened in the updated group j.

When group number j is greater than the number for the last group number, 12 (affirmative decision at step 164), the distance calculation, the screening, etc., have been completed for the last, 192nd, dimension, and the nearest neighbor fast detection process is thereafter terminated.

As is described above, the threshold value is dynamically set for each group using the mathematical function for the cumulative quantity of features, which is not directly related to the number of dimensions during the screening. Unequalness in the distance values, which occurs because the character types have different stroke lengths, is corrected, the reductions in a recognition rate can be held to the minimum, and a nearest neighbor can be detected quickly by screening. In the processing shown in FIG. 4, only the nearest prototype (the first recognition choice) is acquired by the procedures at steps 142 through 146. Prototypes in different categories that are the second nearest, the third nearest, . . . (the second recognition choice, the third recognition choice, . . . ) may be acquired.

Figure 5B:
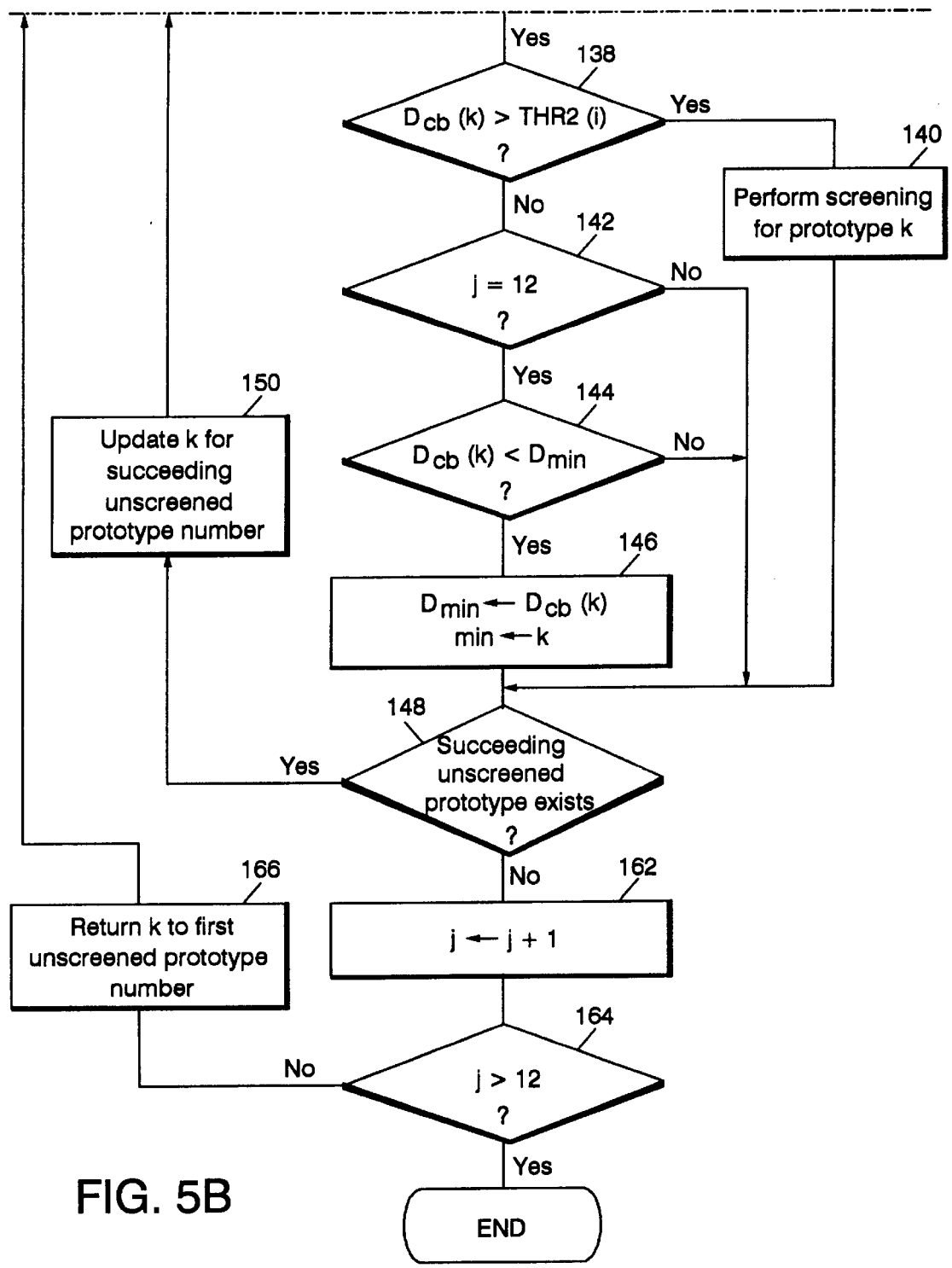

In the example shown in FIG. 4, the threshold value is acquired by using the mathematical function for the accumulated quantities of features that are not directly related to the number of dimensions. When the threshold value is calculated by using a mathematical function for the number of dimensions, an unequal condition where the distance value becomes less reliable as the number of dimensions becomes smaller can be eliminated. This is shown in FIG. 5 as the second process for nearest neighbor fast detection. The same numbers as are used in FIG. 4 are also used in FIG. 5 to denote steps corresponding to those in FIG. 4, and no explanation for them will be given.

As is shown in FIG. 5, first, threshold values THR2(1) through THR2(12) (THR2(1–12)) for groups 1 through 12 are set based on the final dimension number of each group (step 121). For example, when the number of dimensions is small, the threshold value THR2(1–12) is small, and as the distance calculation progresses and the number of dimensions becomes larger, THR2(1–12) is increased. In other words, the individual threshold values THR2(1–12) serve as mathematical functions for the number of dimensions, regardless of the cumulative quantities of features for the input pattern. As well as in the first processing for the fast detection of a nearest neighbor, prototypes whose distances that are obtained for individual groups exceed their threshold values THR2(1–12) are sequentially screened out and excluded from the succeeding distance calculation.

Figure 9:
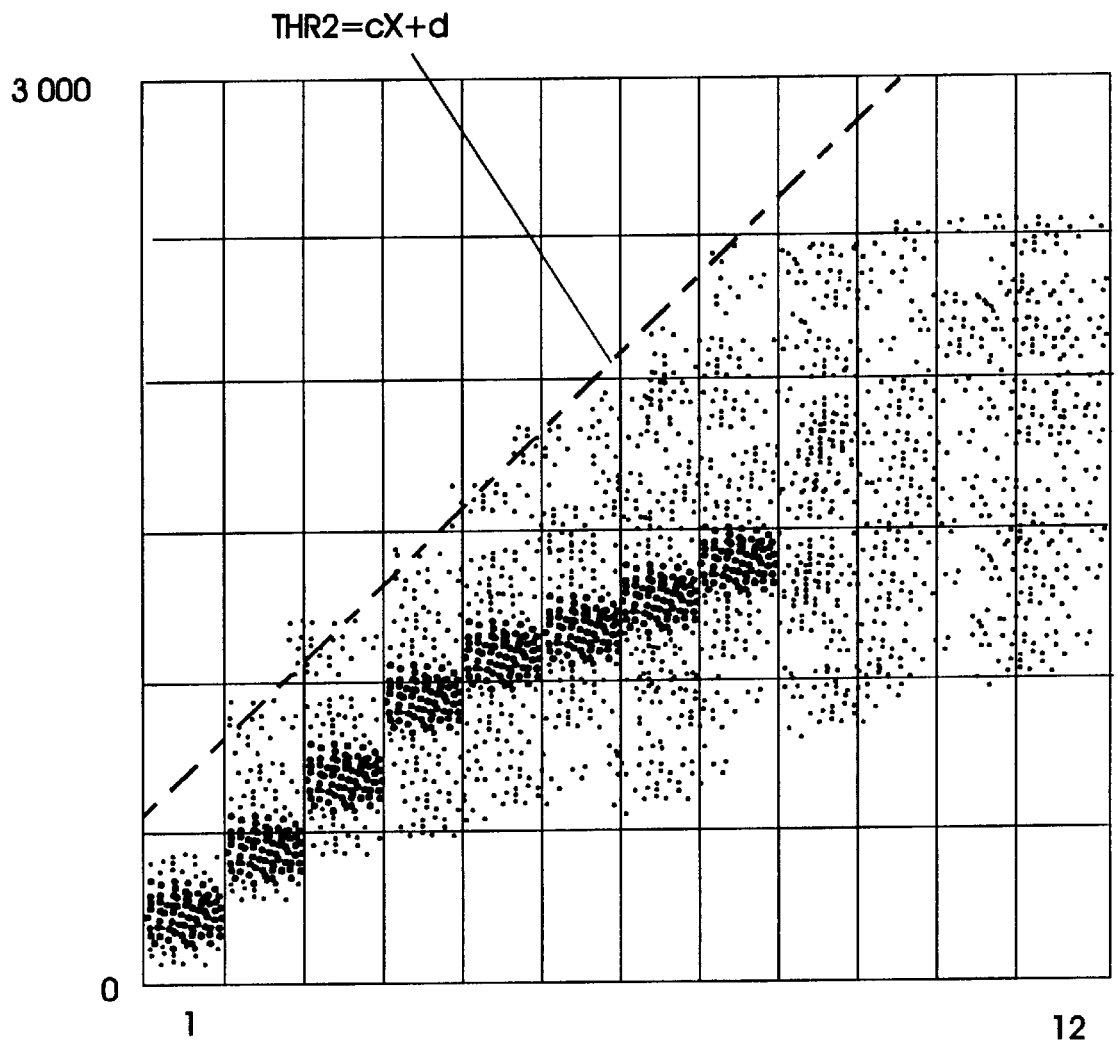
FIG. 9 is a graph on which are plotted multiple experimental samples, which concern a relationship between the number of groups and a city block distance between the input pattern and a prototype of a correct category, to determine a threshold value THR2.

A specific method for setting threshold values THR2 (1–12) is, for example, the following method that is based on a graph in FIG. 9 wherein are plotted data that were acquired during an actual experiment. In FIG. 9, the X axis represents group number X and the vertical ruled lines indicate groups 1 through 12. The Y axis represents a distance value, for all dimensions, including the final dimension, of a group, for an input pattern and for the nearest prototype in the category to which the input pattern belongs. Data for multiple input patterns are plotted. In FIG. 9, if dispersed group numbers are employed and are plotted, points that indicate individual groups will be collected on the vertical ruled lines and the distribution condition will be difficult to understand. Thus, the points are distributed by using random numbers in the X axial direction so as to reduce their distributed density. More specifically, data for all the groups are plotted in a horizontally expanded area; data for group 1 are plotted between the leftmost, the first ruled line, and the second ruled line, and data for group 2 are plotted between the second and the third ruled lines.

In order to set the threshold values THR2(1–12) that are based on the experimental data as is shown in FIG. 9, a straight line acquired from the following expression is so set that most of the dispersed points are located below the line:

$$THR2(X) = c \cdot X + d \qquad (6),$$

wherein c and d are positive constants. If this straight line is located above all the dispersed points, a recognition rate for the data that are used in the experiment can not be reduced by screening.

In expression (6), d must be a given positive value or greater. At the time that calculations have been processed only for 16 dimensions or for 32 dimensions, sorting may be begun with a feature for which the dispersed value is large. When d is near 0, therefore, even a prototype that provides a correct category might be screened out.

Since the features are arranged according to the ascending order of the dispersed values that contribute to the sorting process, as is shown in the distribution in FIG. 9, it is apparent that the rate of increase for the distance value will be reduced as the number of dimensions is increased. Instead of an easy linear function, as in expression (6), a non-linear function may be employed, with which the distribution of dispersed points can be shown more exactly.

Then, distances are calculated in the same manner as in FIG. 4 (steps 130 through 136). The city block distance $D_{cb}(k)$ that is acquired up to the for all dimensions, including the final dimension, of group j is compared with THR2(j) according to expression (7) below (step 138):

$$D_{cb}(k) > THR2(j) \qquad (7).$$

When expression (7) is established (affirmative decision at step 138), prototype k is screened (step 140), and program control shifts to the next process (step 148). While prototypes from group 1 through group 12 are screened in the same manner as in FIG. 4, distance calculation is performed to detect a nearest neighbor.

As is described in the second example, screening is performed by using the set threshold values as the function for the number of dimensions, and the unequal condition in which the obtained distance value becomes less reliable as the number of dimensions during the distance calculations becomes smaller can be eliminated. Further, a reduction in a recognition rate can be minimized and the nearest neighbor can be detected quickly by screening prototypes.

Figure 6B:
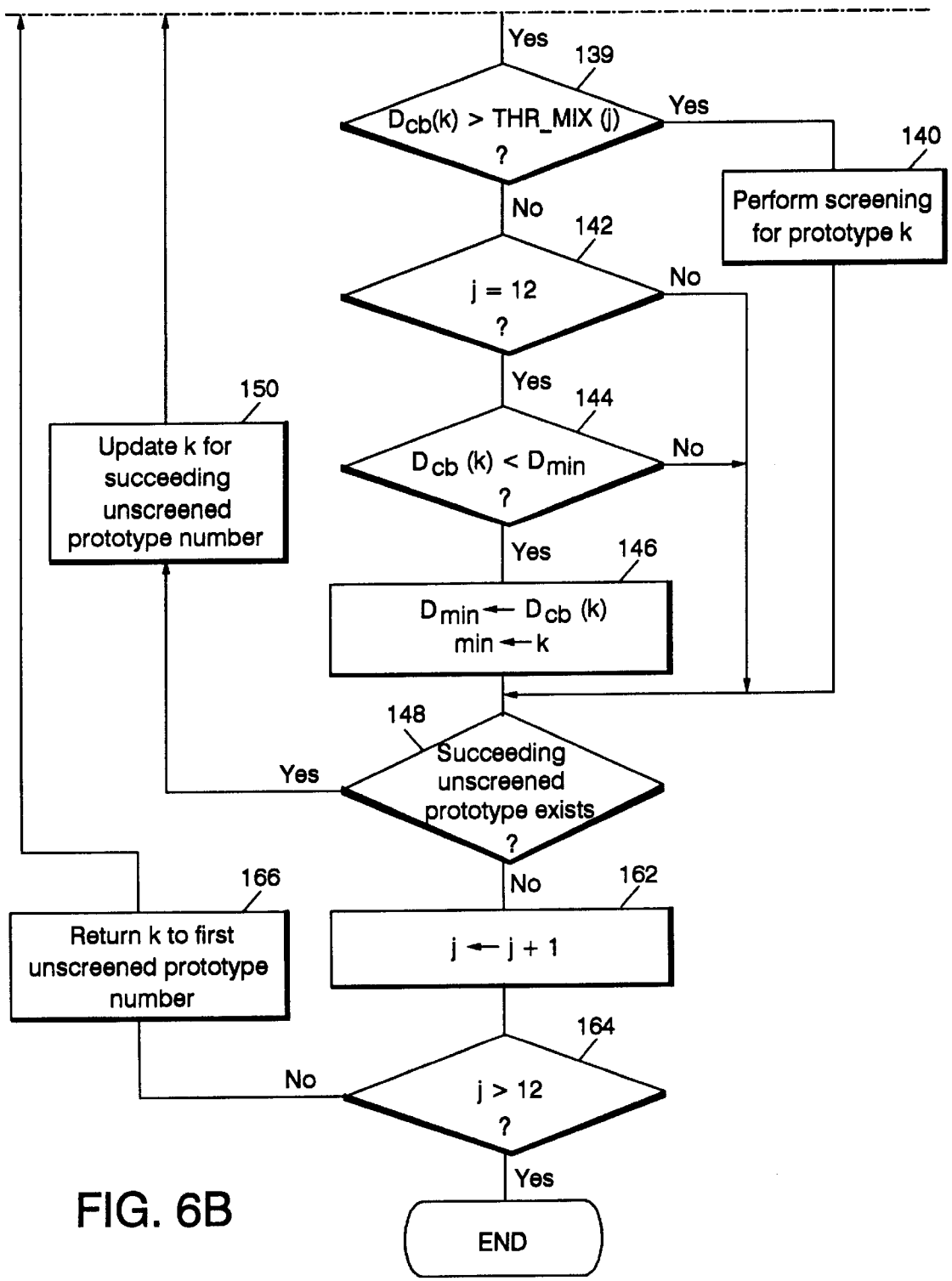

The function for the threshold values, which are set in the first and the second examples for the nearest neighbor fast detection process, describes an approximately straight line. Therefore, for a group whose sampling points vary widely, simply adjusting the constants in expressions (2) and (6) may not enhance the processing efficiency beyond a given level. In this embodiment, therefore, the nearest neighbor fast detection process is prepared, in which the threshold values are mixed to provide new threshold values and to thus increase the reliability of the threshold values. This process is shown as the third example in FIG. 6. In FIG. 6, the same numbers as are used in FIGS. 4 and 5 are also used to denote corresponding steps, and a detailed explanation for them will not be given.

In FIG. 6, threshold values for THR1(1–12) are calculated (step 12) and threshold values THR2(1–12) are set (step 121). These two different threshold values are combined to acquire new threshold values THR_MIX(1–12) (step 122). The combining calculation is performed with the following expression:

$$\text{THR\_MIX}(1\text{–}12) = f(\text{THR1}(1\text{–}12), \text{THR2}(1\text{–}12)) \qquad (8),$$

wherein f(x, y) is a function of x and y.

In this embodiment, function f, for example, is provided as a function for acquiring the average value of x and y. In this case, expression (8) is changed to:

$$\text{THR\_MIX}(1\text{–}12) = (\text{THR1}(1\text{–}12) + \text{THR2}(1\text{–}12))/2 \qquad (9).$$

The function f in expression (8) is not limited to the function for calculating an average value, but may be a function for weighing an average or a non-linear function.

As in the flowcharts in FIGS. 4 and 5, when the city block distance $D_{cb}(k)$, which is calculated up to the dimension that is located between the input pattern and a specific prototype k, has exceeded THR_MIX(1–12), the prototype k is screened out to increase the speed for the detection of a nearest prototype.

In this manner, screening is performed by using the threshold value that reflects two properties of the distance values that are increased in consonance with the cumulative quantities of the features and with the number of dimensions. The threshold value that reflects the variance within a group that is a recognition target is more reliable, and processing efficiency can be increased. In the third example, the calculation for acquiring THR_MIX(1–12) is performed at steps 120 through 122. This quantity of calculations, however, is so small compared to the full quantity of calculations that it can be ignored and does not inhibit high speed processing.

Figures 7, 7A:
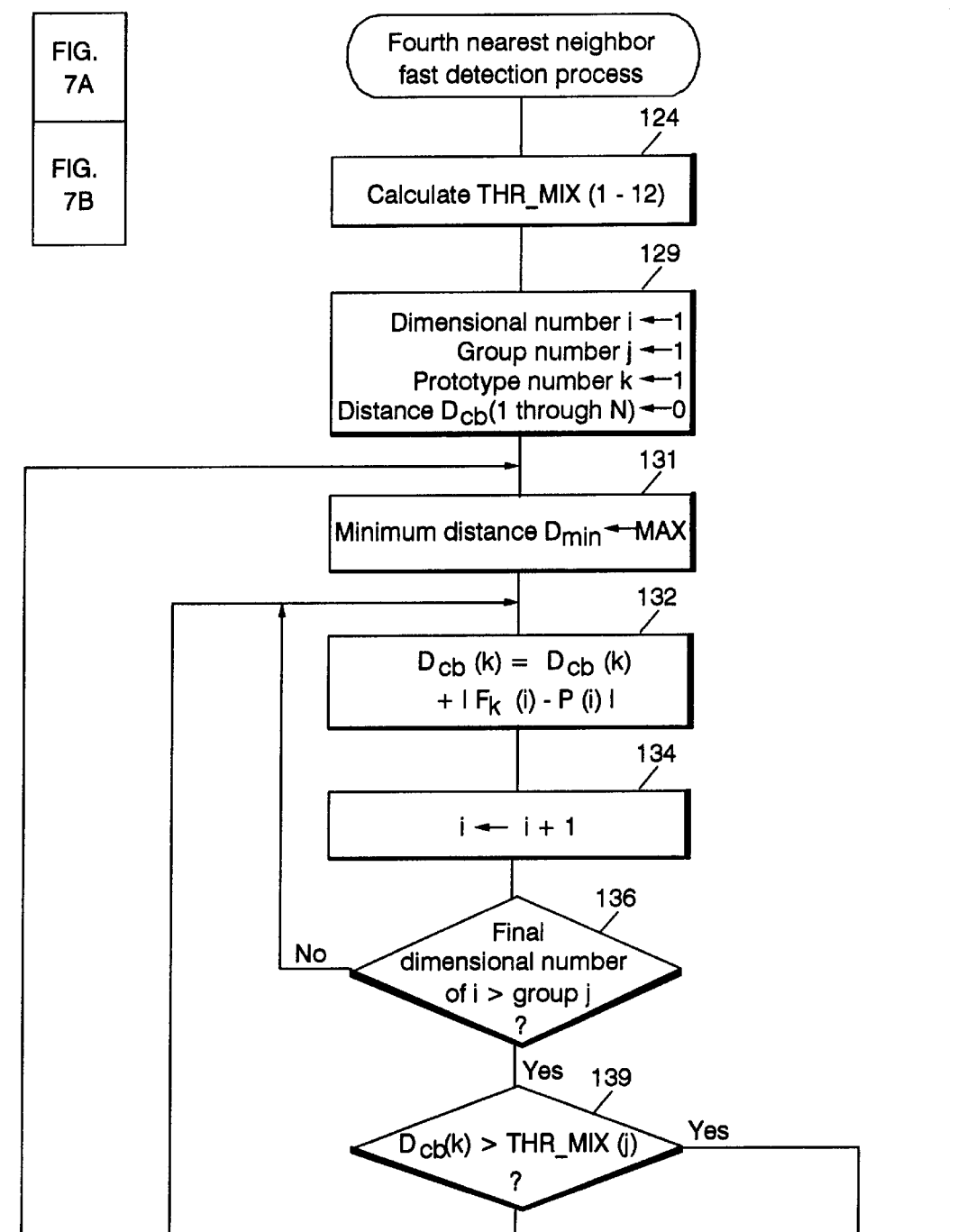
FIG. 7A–B is a flowchart showing a fourth example for a nearest neighbor fast detection process that is performed with the OCR arrangement according to an embodiment of the present invention.
Figure 7B:
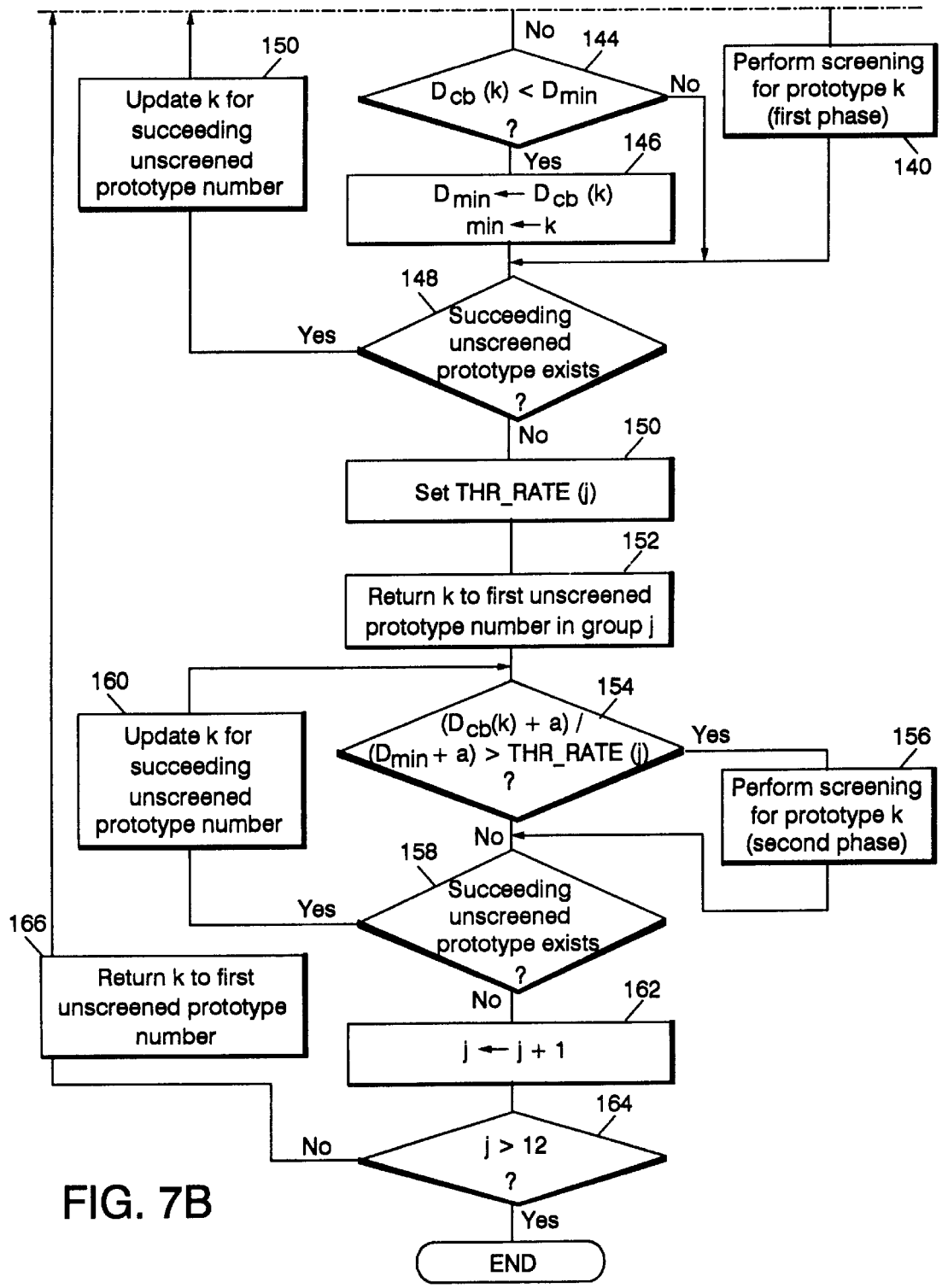

In the first through the third examples for the nearest neighbor fast detection process, screening for one phase is performed by using one threshold value for each group. Screening for two phases may be performed by using two different threshold values for each group. This process will be explained as the fourth example while referring to the flowchart in FIG. 7. In FIG. 7, the same numbers as are used in FIGS. 4 through 6 are used to denote corresponding steps, and no detailed explanation for them will be given.

As is shown in FIG. 7, in the same manner as at steps 120 through 122 in FIG. 6, THR_MIX(1–12) is calculated (step 124). Then, the initial values for dimension number i, group number j, prototype number k, and city block distance $D_{cb}(1)$ through $D_{cb}(N)$ are set (step 129). A maximum value is substituted into the minimum distance $D_{min}$ (step 131). In the fourth example, $D_{min}$ is calculated for each distance calculation for all the groups.

The city block distance $D_{cb}(k)$ between the input pattern and each of the prototypes k in group j is calculated (steps 132 through 136). When the city block distance $D_{cb}(k)$ is greater than THR_MIX(j) (affirmative decision at step 139), the prototype k is screened out (step 140). In other words, this is a first phase screening process that concerns group j, which has been explained while referring to FIG. 6. The above process is performed for all the remaining prototypes that are not screened out (steps 148 and 150). Further, while this process is being performed, the minimum distance $D_{min}$ and the nearest prototype number min in group j are acquired (steps 144 and 146).

When the first phase screening process that is performed by using THR_MIX(j) has been completed for group j (step 148), a second screening process that is described below is performed before the processing is shifted to the next group.

First, threshold value THR_RATE(j) for the second phase is set for group j (step 150). The threshold value THR_RATE(j) is given, by a recognition program, as an empirical rate that is acquired from experimental data, and is 2.5 for group 1, 1.7 for group 2, . . . , or 1.2 for group 11. The details will be given later.

Following this, k is given to the first prototype number that has not been screened (step 152). The following expression is employed to determine whether a ratio of the city block distance $D_{cb}(k)$ between the input pattern and prototype k, which is calculated at steps 132 through 136, to the minimum distance $D_{min}$ in group j has exceeded the threshold value THR_RATE(j) (step 154):

$$(D_{cb}(k)+\alpha)/(D_{min}+\alpha) > \text{THR\_RATE}(j) \qquad (10).$$

The α is a slow-down coefficient to prevent the left side of expression (10) from becoming extremely large, especially when $D_{min}$ for group 1 is 0 or near 0, and is a constant that is determined based on the value of the quantity of features. For the city block distance $D_{cb}(k)$ and the minimum distance $D_{min}$ that are employed in expression (10), the values for the first phase that are obtained at steps 132 through 144 are employed unchanged, so that the increase in the processing time for the second phase can be ignored.

When expression (10) is established (affirmative decision at step 154), screening is performed for the prototype k at the second phase (step 156), and then program control shifts to the succeeding process (step 158). When expression (10) is not established (negative decision at step 154), program control immediately shifts to the succeeding process (step 158).

Then, a check is performed to determine whether or not there is a succeeding prototype that has not been screened out (step 158). If there is a succeeding unscreened prototype (affirmative decision at step 158), k is updated to the number for the unscreened prototype (step 160). Expression (10) is employed to determine the city block distance between the input pattern and a succeeding prototype, and the above described process is repeated until there is no prototype that has not been screened (negative decision at step 158).

At the second phase, according to the new threshold value THR_RATE(j), screening is again performed for the prototypes that remain after the first phase screening has been completed for group j.

When the screening at the second phase has been performed for all the remaining prototypes (negative decision at step 158), group number j is incremented by 1 to shift the process to the next group number (step 162). When j is not greater than the last group number, 12 (negative decision at step 166), the value for k is returned to the number for the first unscreened prototype, and a maximum value is substituted into the minimum distance $D_{min}$ (step 131). Then, the first and the second phase screening processes are performed for the next group in the same manner as is described above.

When the updated group number is greater than 12 (affirmative decision at step 164), the fourth process for the nearest neighbor fast detection is terminated.

As is described above, two-phase screening is performed for the same group by using two threshold values, THR_MIX(1–12) and THR_RATE (1–12). The second phase screening especially is performed extremely fast as the result obtained at the first phase screening is merely checked. Because of this, there is only a small increase in the processing time, which is due to the addition of the second phase screening. The effects obtained by the two-phase screening complement each other and thus provide a nearest neighbor fast detection process.

Figure 10:
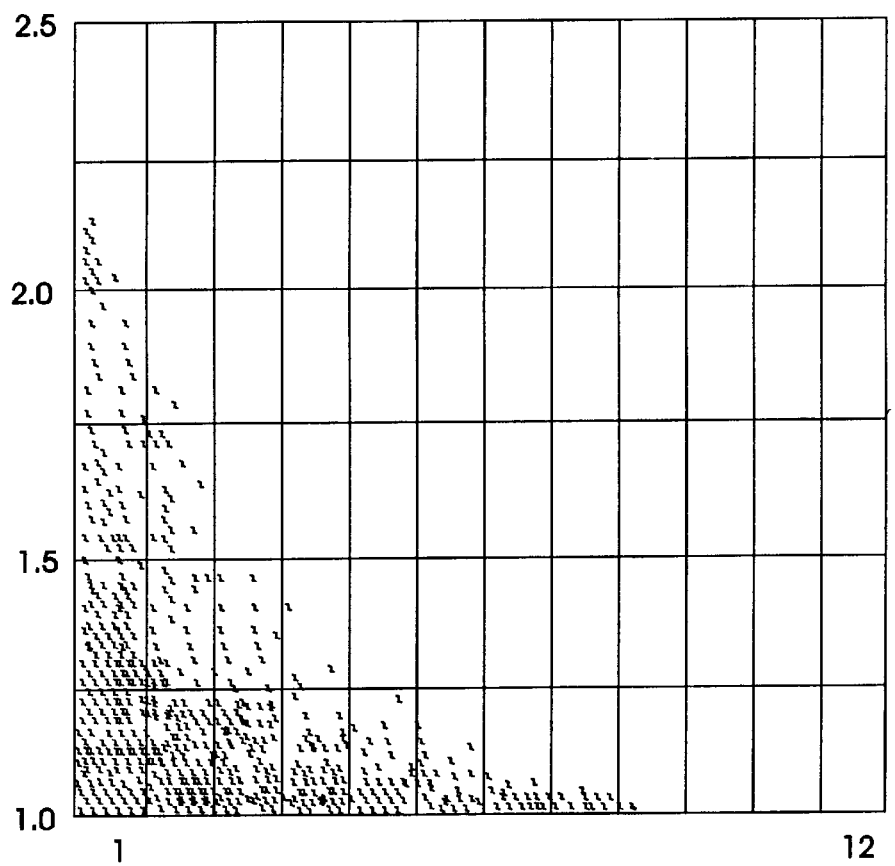
FIG. 10 is a graph on which are plotted multiple experimental samples, which concern a relationship between the number of groups and a city block distance between an input pattern and a prototype in a correct category, as they are related to a city block distance between the input pattern and the shortest prototype in a pertinent group, so that a threshold value THR_RATE is determined.

A specific method for setting threshold value THR_RATE(1–12) is, for example, the following method that is based on a graph in FIG. 10, wherein actual experimental data are plotted.

In FIG. 10, the X axis represents group number X and the vertical ruled lines indicate groups 1 through 12. The slow-down coefficient in expression (10) is added to a distance between a prototype, which is nearest to the input pattern in a selected category to which the input pattern belongs, and the dimension of an input pattern, and to a distance between the nearest prototype of all the prototypes and the pertinent dimension. The ratio for both is then acquired. The Y axis represents that ratio.

In FIG. 10, if dispersed group numbers are employed for the plotting, points will be collected on the vertical ruled lines that indicate individual groups and the distribution condition will be difficult to understand. Thus, the points are distributed by using random numbers in the X axial direction so as to reduce their distributed frequency.

As is shown in FIG. 10, points are distributed up to around the ratio of 2.5 for the first group, around 1.75 for the second group, and below 1.1, or almost in the vicinity of 1.0, for the eleventh group, the second from the last. It is assumed that when the THR_RATE(1–12) is set substantially the same as these ratios, the recognition rate for the experimental data will not be reduced by the second phase screening.

Actually, as is described above, a value that is a little greater than the experimental data is given, so that the threshold value THR_RATE (11) for group 11=1.2, for example. It is highly improbable that a distance of 1.2 times the shortest distance, which is obtained through the calculations for groups 1 to 11, will become the nearest through the calculation for the last group 12. It is preferable that screening be performed with a sufficient threshold value in order to perform detailed recognition in the recognition process at step 108 in FIG. 3, or to additionally perform post-processing for a plurality of recognition choices by using work processing, or to leave recognition choices for an operator to correct errors on a screen.

Figure 11:
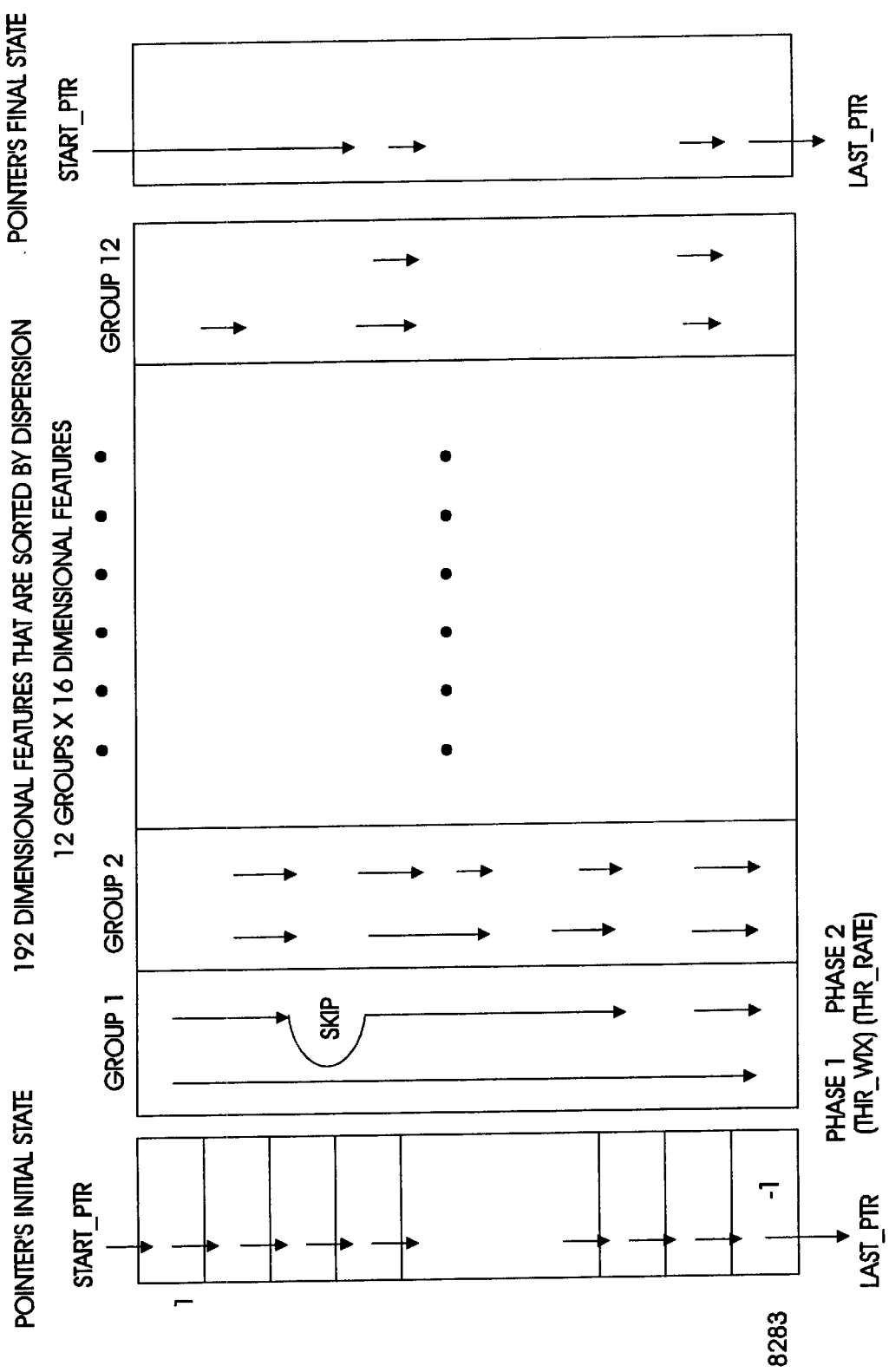
FIG. 11 is a diagram showing the initial state of a pointer that designates a valid prototype, the condition of the groups, and the final state.

When the fourth example in FIG. 7 is carried out by an actual program, the method in FIG. 11 can be employed to exclude a prototype that has once been screened out and to perform calculations. According to this method, a pointer array (NEXT_PTR) that points at a succeeding valid prototype is prepared. First, for the first valid prototype, the pointer enters a pointer value of START_PTR, and for the last valid prototype, it enters a value of 31 1(LAST_PTR), to indicate it is the last.

As is shown in the left column in FIG. 11, in the initial state of the pointer where prototypes before the distance calculation starts are not screened out, NEXT_PTR is employed to point to a succeeding prototype, but excluding the last prototype.

The condition of the pointer at phase 1 for group 1 in FIG. 11 is the same as the initial condition. When a prototype at phase 1 is screened out, program control rewrites the process so as to skip that prototype and to point to a succeeding prototype that has not been screened. In this case, the pointer skips the prototype and points to a succeeding prototype that has not been screened.

In group 2, the prototypes that are skipped are increased. When phase 2 screening is completed for group 12, depending on the final state of the pointer, almost all the prototypes are to be skipped, as is the case in the right column in FIG. 11. Therefore, the number of calculations is considerably reduced.

As is described above, the first through the fourth examples for the nearest neighbor fast detection process have been explained while referring to FIGS. 4 through 7. In Table 1 are shown the differences in the processing efficiency for the individual processes that are listed for specific conditions.

TABLE 1

|  | Speed (C/S) | RECO_RATE (%) | NN_RATE (%) |
|---|---|---|---|
| A. No Screening | 3.3 | 89.06 | 100.00 |
| B. THR1 | 6.4 | 88.96 | 99.86 |
| C. THR2 | 10.3 | 88.72 | 99.51 |
| D. THR_MIX-1 | 11.7 | 89.02 | 99.95 |
| E. THR_MIX-2 | 12.4 | 88.99 | 99.91 |
| F. THR_MIX + THR_RATE | 14.8 | 89.00 | 99.92 |

In Table 1, the speed is the number of characters that can be recognized within one second (Character/sec), RECO_RATE is a recognition rate ((the number of correct solutions/the number of recognitions) * 100%), and NN_RATE is a detection rate (%) for a nearest neighbor. The RECO_RATE and the NN_RATE are provided from the results that were obtained from the distance calculations for about 26,000 test characters (about 9 input patterns per category) in 2,800 categories that covered handwritten Chinese characters, hiragana, katakana, numbers, alphabets and special characters, and 8,283 prototypes (about three per category) that were prepared from about one million study characters.

In A. are shown the processing efficiency results for the calculation of distances between an input pattern and all the prototypes when no screening is performed; in B., when the first nearest neighbor fast detection processing is performed by using only threshold value THR1 (FIG. 4); and in C., when the second nearest neighbor fast detection processing is performed by using only threshold value THR2 (FIG. 5). In D. and E., the efficiency results are shown for when the third process for fast detection of the nearest neighbor is performed by using threshold value THR_MIX (FIG. 6), with, in each case, a different parameter (b+d) being set to ascertain whether the effect is derived from a mixture of the threshold values or merely from a change in the threshold values. In F., the efficiency results are shown for the fourth process for fast detection of the nearest neighbor, in which two phase screening is performed by using two different threshold values, THR_MIX and THR_RATE (FIG. 7).

As is shown in Table 1, in A., where there is no screening, the nearest neighbor detection rate is naturally 100%, depending on the definition of the nearest neighbor, and the recognition rate is also higher than in any other case where screening is performed. However, the processing speed is the lowest, about ½ to ¼.5 of the speed in B. through F.

In B., although the recognition rate and the nearest neighbor detection rate, which are respectively reduced 0.1% and 0.14%, are lower than those in A., the processing speed is about 1.94 times as fast. In C., although the recognition rate and the nearest neighbor detection rate are reduced by 0.34% and 0.49%, which is a greater reduction than for those in B, the speed is about 3.12 times as fast. As is apparent, therefore, the processing efficiency can be enhanced to a degree even by using THR1 or THR2 independently.

When THR_MIX, which is acquired from the mixed threshold values, is employed, the speed, the recognition rate, and the nearest neighbor detection rate are all substantially increased compared with those in B. and C. In D., for example, the reductions in the recognition and the nearest neighbor detection rate are considerably lower than those in A. and are 0.04% and 0.05%, respectively. The speed is increased so that it is about 3.55 times faster than those in B. and C. In E., where the constant of the mixed threshold value is set to a different value from that in D., although the speed is about 3.76 times faster, the reductions in the recognition rate and in the nearest neighbor detection rate are about 0.07% and about 0.09%, respectively, which are greater than those in D. As a whole, the processing efficiency is not very much different from that in D. This is not simply a matter of the processing efficiency being incidentally enhanced due to a change in the threshold value, but is apparent an evidence that a remarkable effect is obtained by mixing the threshold values.

In F., where second phase screening is performed in addition to screening for which the mixed threshold value is employed, the speed is the highest of all, about 4.5 times of that in A., and high speed processing is thus provided. The reductions in the recognition rate and the nearest neighbor detection rate are about 0.06% and about 0.08%, respectively, compared with those in A. Therefore, the results are in all aspects better than those in E.

Table 1 shows the results that were obtained with handwritten characters. When characters, such as printed characters, whose feature quantities do not vary widely, are employed as recognition targets, better processing efficiency is provided in each case for B. through F. Especially when the method in F. is used for printed character recognition, the recognition rate is not substantially reduced, and the speed greatly exceeds 4.5 times of the speed obtained in A. for hand written character recognition.

The explanation that has been given is for when the present invention is applied for an OCR apparatus; however, the present invention is not limited to the above described embodiment. The present invention can be applied for all other types of pattern recognition apparatuses that, for example, detect the prototype that is nearest to an input pattern, and output a recognition result that is based on a category to which a prototype belongs. Such pattern recognition apparatuses are speech recognition apparatuses, image recognition apparatuses, etc. Further, the present invention provides not only OCR by employing a recognition program, but also may be constituted as a character recognition apparatus that has a unique hardware arrangement for character recognition.

In addition to being employed as a pattern recognition apparatus, the present invention can be designed as a nearest neighbor detection apparatus that detects the nearest neighbor according to the method shown in FIGS. 4 through 7. When the nearest neighbor detection method or the nearest neighbor detection apparatus is employed, attention must be given to the following matters so as to determine the threshold value that is based on multiple experiment samples. Since, in FIG. 8, the categories need only to be matched at the last, even though the true nearest neighbor is not detected, the Y axis represents a current distance value between an input pattern and a prototype, of the prototypes in the category to which the input pattern belongs, that is the nearest to the input pattern. With the nearest neighbor detection method, however, the Y axis represents a current distance value between the input pattern and the true nearest prototype. The distances for multiple samples are plotted and a threshold value must be determined by distribution. The same procedure can be applied for FIGS. 9 and 10. In these cases, it is evident that high speed processing can be performed while the nearest neighbor detection rate is the lowest.

In the above embodiment, a plurality of feature dimensions are regarded as one group. The nearest neighbor fast detection process according to the present invention can be applied for one group with one feature dimension. In other words, screening may be performed according to the distance value which is calculated for each feature dimension.

In the fourth example process for fast detection of the nearest neighbor (FIG. 7), screening is performed by combining THR_MIX and THR_RATE. Screening may also be performed by combining either THR1 or THR2 and THR_RATE.

The types of features that are extracted at step 104, the number of dimensions, the distance types that are employed at step 106, the processing in FIGS. 4 through 7, and the structure in FIG. 2 can be appropriately and arbitrarily altered.

Although the present invention has been described with respect to a specific preferred embodiment thereof, various changes and modifications may be suggested to one skilled in the art, and it is intended that the present invention encompass such changes and modifications as fall within the scope of the appended claims.

I claim:

1. A neighbor detection method, in a feature space comprised of a plurality of dimensions, wherein each dimension represents one of a plurality of features of pattern attributes, for calculating distance values between an input point and a plurality of prototypes that are distributed across a feature space, and for detecting a neighbor prototype that has a small distance value, comprising the steps of:

(a) sorting said plurality of features to a plurality of groups, with each of said plurality of groups comprising at least one of said plurality of features;

(b) determining a first threshold value for said plurality of groups, wherein said first threshold value is based on a quantity of information related to said plurality of features of each of said plurality of groups, and wherein said first threshold value is assigned to at least two groups of said plurality of groups as different values;

(c) calculating an accumulated distance value for said plurality of groups to add distance values of said input point and said plurality of prototypes, according to a predetermined order and calculating a minimum accumulated distance value for each of said groups;

(d) excluding, from a target for a following distance calculation, a prototype for which said accumulated distance value to a first specific group in said feature space is provided that exceeds said first threshold value assigned to said first specific group; and (e) excluding, from the target for a following distance calculation, a sample point for which said minimum accumulated distance value to a second specific group in said feature space is provided that exceeds a second threshold value assigned to said second specific group wherein said second threshold is determined of said minimum accumulated distance value of said second specific group, wherein said second specific group is the target for calculation of step (d).

2. The neighbor detection method according to claim 1, wherein said first threshold value is determined by a cumulative quantity of features, which is obtained by adding together, in said predetermined order, quantities of features for said input point for each of said groups.

3. The neighbor detection method according to claim 1, wherein said first threshold value is determined by a cumulative number of features, which is acquired by adding together, in said predetermined order, the number of said features for said groups.

4. The neighbor detection method according to claim 1, wherein said first threshold value is determined by a cumulative quantity of features, which is obtained by adding together, in said predetermined order, quantities of features for said input point until limits for said groups are reached, and a cumulative number of features, which is obtained by adding together, in said predetermined order, the number of said features for said groups.

5. The neighbor detection method according to claim 4, wherein said first threshold value is determined by an average value for said cumulative quantity of features and said cumulative number of features.

6. The neighbor detection method according to claim 5, wherein said predetermined order is in consonance with a degree of dispersion for the quantity of features that is found in each of said groups.

7. A neighbor detection system, in a feature space comprised of a plurality of dimensions, wherein each dimension represents one of a plurality of features of pattern attributes, for calculating distance values between an input point and a plurality of prototypes that are distributed across a feature space, and for detecting a neighbor prototype that has a small distance value, comprising:

(a) means for sorting said plurality of features to a plurality of groups, with each of said plurality of groups comprising at least one of said plurality of features;

(b) means for determining a first threshold value for said plurality of groups, wherein said first threshold value is based on a quantity of information related to said plurality of features of each of said plurality of groups, and wherein said first threshold value is assigned to a least two groups of said plurality of groups as different values;

(c) means for calculating an accumulated distance value for said plurality of groups to add distance values of said input point and said plurality of prototypes, according to a predetermined order and calculating a minimum accumulated distance value for each of said groups;

(d) means for excluding, from a target for a following distance calculation, a prototype for which said accumulated distance value to a first specific group in said feature space is provided that exceeds said first threshold value assigned to said first specific group; and (e) means for excluding, from the target for a following distance calculation, a sample point for which said minimum accumulated distance value to a second specific group in said feature space is provided that exceeds a second threshold value assigned to said second specific group wherein said second threshold is determined on said minimum accumulated distance value of said second specific group, wherein said second specific group is the target for calculation of said means for excluding a prototype.

8. The neighbor detection system of claim 7, wherein said first threshold value is determined by a cumulative quantity of features, which is obtained by adding together, in said predetermined order, quantities of features for said input point for each of said groups.

9. The system of claim 7, wherein said first threshold value is determined by a cumulative number of features, which is acquired by adding together, in said predetermined order, the number of said features for said groups.

10. The system of claim 7, wherein said first threshold value is determined by a cumulative quantity of features, which is obtained by adding together, in said predetermined order, quantities of features for said input point until limits for said groups are reached, and a cumulative number of features, which is obtained by adding together, in said predetermined order, the number of said features for said groups.

11. The system of claim 10, wherein said first threshold value is determined by an average value for said cumulative quantity of features and said cumulative number of features.

12. The system of claim 11, wherein said predetermined order is in consonance with a degree of dispersion for the quantity of features that is found in each of said groups.

13. A computer program product recorded on computer readable media for a neighbor detection system, in a feature space comprised of a plurality of dimensions, wherein each dimension represents one of a plurality of features of pattern attributes, for calculating distance values between an input point and a plurality of prototypes that are distributed across a feature space, and for detecting a neighbor prototype that has a small distance value, said product comprising:

(a) computer readable means for sorting said plurality of features to a plurality of groups, with each of said plurality of groups comprising at least one of said plurality of features;

(b) computer readable means for determining a first threshold value for said plurality of groups, wherein said first threshold value is based on a quantity of information related to said plurality of features of each of said plurality of groups, and wherein said first threshold value is assigned to a least two groups of said plurality of groups as different values;

(c) computer readable means for calculating an accumulated distance value for said plurality of groups to add distance values of said input point and said plurality of prototypes, according to a predetermined order and calculating a minimum accumulated distance value for each of said groups;

(d) computer readable means for excluding, from a target for a following distance calculation, a prototype for which said accumulated distance value to a first specific group in said feature space is provided that exceeds said first threshold value assigned to said first specific group; and (e) computer readable means for excluding, from the target for a following distance calculation, a sample point for which said minimum accumulated distance value to a second specific group in said feature space is provided that exceeds a second threshold value assigned to said second specific group wherein said second threshold is determined on said minimum accumulated distance value of said second specific group, wherein said second specific group is the target for calculation of said computer readable means for excluding a prototype.

14. The computer program product of claim 13, wherein said first threshold value is determined by a cumulative quantity of features, which is obtained by adding together, in said predetermined order, quantities of features for said input point for each of said groups.

15. The computer program product of claim 13, wherein said first threshold value is determined by a cumulative number of features, which is acquired by adding together, in said predetermined order, the number of said features for said groups.

16. The computer program product of claim 13, wherein said first threshold value is determined by a cumulative quantity of features, which is obtained by adding together, in said predetermined order, quantities of features for said input point until limits for said groups are reached, and a cumulative number of features, which is obtained by adding together, in said predetermined order, the number of said features for said groups.

17. The computer program product of claim 16, wherein said first threshold value is determined by an average value for said cumulative quantity of features and said cumulative number of features.

* * * * *

UNITED STATES PATENT AND TRADEMARK OFFICE
CERTIFICATE OF CORRECTION

PATENT NO.    : 5,937,093
DATED         : August 17, 1999
INVENTOR(S)   : Hiroyasu Takahashi It is certified that error appears in the above-identified patent and that said Letters Patent is hereby corrected as shown below:

On the title page: Item [54] and Column 1, line 3,

> Pattern Recognition Methods and Apparatus to Reduce Processing Time by Groupwise Comparison of Features and Coordinated Dynamic Elimination of Candidates Signed and Sealed this Seventh Day of December, 1999

*Attest:*

Q. TODD DICKINSON

*Attesting Officer*     *Acting Commissioner of Patents and Trademarks*